(12) United States Patent
Soltani et al.

(10) Patent No.: US 11,723,053 B2
(45) Date of Patent: Aug. 8, 2023

(54) TIME DOMAIN CORESET DESIGN FOR SINGLE CARRIER WAVEFORMS

(71) Applicant: QUALCOMM Incorporated, San Diego, CA (US)

(72) Inventors: Morteza Soltani, San Diego, CA (US); Jun Ma, San Diego, CA (US); Xiaoxia Zhang, San Diego, CA (US); Iyab Issam Sakhnini, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/370,370

(22) Filed: Jul. 8, 2021

(65) Prior Publication Data

US 2023/0011861 A1    Jan. 12, 2023

(51) Int. Cl.
*H04W 72/0446* (2023.01)
*H04W 72/10* (2009.01)
*H04W 72/53* (2023.01)
*H04L 27/26* (2006.01)
*H04W 80/02* (2009.01)
*H04W 72/23* (2023.01)

(52) U.S. Cl.
CPC ......... *H04W 72/53* (2023.01); *H04L 27/2607* (2013.01); *H04L 27/26524* (2021.01); *H04W 72/0446* (2013.01); *H04W 72/23* (2023.01); *H04W 80/02* (2013.01)

(58) Field of Classification Search
None
See application file for complete search history.

(56) References Cited

U.S. PATENT DOCUMENTS

| | | | |
|---|---|---|---|
| 2006/0039273 A1* | 2/2006 | Gore | H04L 5/0044 370/208 |
| 2018/0212733 A1* | 7/2018 | Khoryaev | H04W 56/0035 |
| 2018/0310322 A1* | 10/2018 | Zhang | H04L 5/0053 |
| 2018/0367362 A1* | 12/2018 | Sun | H04L 27/2605 |
| 2020/0396744 A1* | 12/2020 | Xiong | H04L 5/0051 |
| 2021/0136806 A1* | 5/2021 | Xiong | H04W 72/23 |
| 2021/0160111 A1* | 5/2021 | Ma | H04L 27/2628 |
| 2022/0166580 A1* | 5/2022 | Zhu | H04L 27/2613 |

* cited by examiner

*Primary Examiner* — Duc T Duong
(74) *Attorney, Agent, or Firm* — Holland & Hart LLP

(57) ABSTRACT

Methods, systems, and devices for wireless communications are described in which control information is transmitted using a single carrier (SC) waveform in time domain blocks without a cyclic prefix (CP). A base station may configure a user equipment (UE) for control information transmissions using a SC waveform without CPs in time domain blocks, and may activate the SC waveform without CPs in time domain blocks based on one or more parameters. The control information may be non-uniformly segmented across two or more time domain blocks or two or more portions of a time domain block. A reference signal, such as a demodulation reference signal, may be transmitted in the time domain blocks, where the reference signals may be distributed evenly or unevenly across the time domain blocks.

30 Claims, 19 Drawing Sheets

- UE Capability 215
- Configuration Information 220
- Non-CP Transmission Activation 225
- Control Information 230

200

TIME DOMAIN CORESET DESIGN FOR SINGLE CARRIER WAVEFORMS

FIELD OF TECHNOLOGY

The following relates to wireless communications, including time domain CORESET design for single carrier waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless multiple-access communications systems, relatively high frequency bands may be used, such as frequencies in the range of 52 GHz to 71 GHz, which may be referred to as frequency range 4 (FR4), or higher (e.g., FR5 and beyond). Communications in such higher frequency bands may result in transmissions that experience relatively large amounts of signal attenuation over relatively short distances, may result in relatively large amounts of power consumption at UEs and base stations, may necessitate additional processing resources relative to transmissions in lower frequency bands, or any combinations thereof. Accordingly, techniques for enhancing efficiencies for wireless communications in higher frequency bands are desirable.

SUMMARY

The described techniques relate to improved methods, systems, devices, and apparatuses that support time domain CORESET design for single carrier waveforms. In accordance with various aspects, described techniques provide for enhanced efficiencies for communications in higher frequency bands (e.g., FR4 and beyond). In some cases, communications in higher frequency bands may use a single carrier (SC) waveform (e.g., a SC quadrature amplitude modulation (SC-QAM) waveform) to transmit control information in time domain blocks without a cyclic prefix (CP). In some cases, a base station may configure a user equipment (UE) for control information transmissions (e.g., control resource set (CORESET) transmissions) using a SC waveform without CPs in time domain blocks. The base station may activate the SC waveform without CPs in time domain blocks for control information communications, and transmit the control information using the configured SC waveform. In some cases, the control information may be non-uniformly segmented across two or more time domain blocks or two or more portions of a time domain block. Additionally or alternatively, a reference signal (e.g., a demodulation reference signal (DMRS)) may be transmitted in the two or more time domain blocks, where the reference signals may be distributed evenly or unevenly across the two or more time domain blocks.

A method for wireless communication at a user equipment (UE) is described. The method may include receiving, from a base station, an indication that control information is transmitted using a single carrier waveform in two or more time domain blocks, each of the two or more time domain blocks without a cyclic prefix, receiving, according to the indication, the two or more time domain blocks via the single carrier waveform, and decoding the control information from the two or more time domain blocks.

An apparatus for wireless communication at a UE is described. The apparatus may include a processor, memory coupled with the processor, and instructions stored in the memory. The instructions may be executable by the processor to cause the apparatus to receive, from a base station, an indication that control information is transmitted using a single carrier waveform in two or more time domain blocks, each of the two or more time domain blocks without a cyclic prefix, receive, according to the indication, the two or more time domain blocks via the single carrier waveform, and decode the control information from the two or more time domain blocks.

Another apparatus for wireless communication at a UE is described. The apparatus may include means for receiving, from a base station, an indication that control information is transmitted using a single carrier waveform in two or more time domain blocks, each of the two or more time domain blocks without a cyclic prefix, means for receiving, according to the indication, the two or more time domain blocks via the single carrier waveform, and means for decoding the control information from the two or more time domain blocks.

A non-transitory computer-readable medium storing code for wireless communication at a UE is described. The code may include instructions executable by a processor to receive, from a base station, an indication that control information is transmitted using a single carrier waveform in two or more time domain blocks, each of the two or more time domain blocks without a cyclic prefix, receive, according to the indication, the two or more time domain blocks via the single carrier waveform, and decode the control information from the two or more time domain blocks.

In some examples of the method, apparatuses, and non-transitory computer-readable medium described herein, the control information may be transmitted in two or more control channel elements (CCEs) in the two or more time domain blocks. Some examples of the method, apparatuses, and non-transitory computer-readable medium described herein may further include operations, features, means, or instructions for receiving an aggregation level for control information that is transmitted without a cyclic prefix, and where the decoding is further based on the aggregation level. In some examples of the method, apparatuses, and non-transitory computer-readable medium described herein, the control information may be non-uniformly segmented across the two or more CCEs in the two or more time domain blocks.

In some examples of the method, apparatuses, and non-transitory computer-readable medium described herein, each CCE may have an associated demodulation reference signal (DMRS) that is transmitted in a corresponding time domain block. In some examples of the method, apparatuses, and non-transitory computer-readable medium described herein, two or more DMRSs may be non-uniform across the two or more time domain blocks. In some examples of the method, apparatuses, and non-transitory computer-readable medium described herein, each CCE and associated DMRS may be distributed in the two or more time domain blocks based on time domain parameters without any fast Fourier transform (FFT) size restrictions.

In some examples of the method, apparatuses, and non-transitory computer-readable medium described herein, the receiving the indication may include operations, features, means, or instructions for receiving radio resource control (RRC) signaling that includes one or more parameters associated with control information transmissions. Some examples of the method, apparatuses, and non-transitory computer-readable medium described herein may further include operations, features, means, or instructions for receiving, subsequent to receiving the indication, a message that enables the decoding of the control information from the two or more time domain blocks based on each of the two or more time domain blocks being transmitted without a cyclic prefix. In some examples of the method, apparatuses, and non-transitory computer-readable medium described herein, the message may be received in one or more of a medium access control (MAC) control element, a downlink control information (DCI) transmission, RRC signaling, or any combinations thereof.

A method for wireless communication at a base station is described. The method may include transmitting, to a UE, an indication that a control information transmission uses a single carrier waveform in two or more time domain blocks, each of the two or more time domain blocks without a cyclic prefix, determining to enable the control information transmissions that use the single carrier waveform in two or more time domain blocks without cyclic prefix, and transmitting, to the UE, the control information in the two or more time domain blocks without cyclic prefix using the single carrier waveform.

An apparatus for wireless communication at a base station is described. The apparatus may include a processor, memory coupled with the processor, and instructions stored in the memory. The instructions may be executable by the processor to cause the apparatus to transmit, to a UE, an indication that a control information transmission uses a single carrier waveform in two or more time domain blocks, each of the two or more time domain blocks without a cyclic prefix, determine to enable the control information transmissions that use the single carrier waveform in two or more time domain blocks without cyclic prefix, and transmit, to the UE, the control information in the two or more time domain blocks without cyclic prefix using the single carrier waveform.

Another apparatus for wireless communication at a base station is described. The apparatus may include means for transmitting, to a UE, an indication that a control information transmission uses a single carrier waveform in two or more time domain blocks, each of the two or more time domain blocks without a cyclic prefix, means for determining to enable the control information transmissions that use the single carrier waveform in two or more time domain blocks without cyclic prefix, and means for transmitting, to the UE, the control information in the two or more time domain blocks without cyclic prefix using the single carrier waveform.

A non-transitory computer-readable medium storing code for wireless communication at a base station is described. The code may include instructions executable by a processor to transmit, to a UE, an indication that a control information transmission uses a single carrier waveform in two or more time domain blocks, each of the two or more time domain blocks without a cyclic prefix, determine to enable the control information transmissions that use the single carrier waveform in two or more time domain blocks without cyclic prefix, and transmit, to the UE, the control information in the two or more time domain blocks without cyclic prefix using the single carrier waveform.

In some examples of the method, apparatuses, and non-transitory computer-readable medium described herein, the control information may be transmitted in two or more CCEs in the two or more time domain blocks. In some examples of the method, apparatuses, and non-transitory computer-readable medium described herein, the indication further provides an aggregation level for control information that is transmitted without a cyclic prefix. In some examples of the method, apparatuses, and non-transitory computer-readable medium described herein, the control information may be non-uniformly segmented across the two or more CCEs.

In some examples of the method, apparatuses, and non-transitory computer-readable medium described herein, each CCE may have an associated DMRS that is transmitted in a corresponding time domain block. In some examples of the method, apparatuses, and non-transitory computer-readable medium described herein, two or more DMRSs may be non-uniform across the two or more time domain blocks. In some examples of the method, apparatuses, and non-transitory computer-readable medium described herein, each CCE and associated DMRS may be distributed in the two or more time domain blocks based on time domain parameters without any FFT size restrictions.

In some examples of the method, apparatuses, and non-transitory computer-readable medium described herein, the transmitting the indication may include operations, features, means, or instructions for transmitting RRC signaling that includes one or more parameters associated with control information transmissions. Some examples of the method, apparatuses, and non-transitory computer-readable medium described herein may further include operations, features, means, or instructions for transmitting, subsequent to transmitting the RRC signaling, a message to the UE to enable transmission of the control information using the single carrier waveform in the two or more time domain blocks without a cyclic prefix. In some examples of the method, apparatuses, and non-transitory computer-readable medium described herein, the message may be transmitted in one or more of a MAC control element, a DCI transmission, RRC signaling, or any combinations thereof.

DETAILED DESCRIPTION

Figure 1:
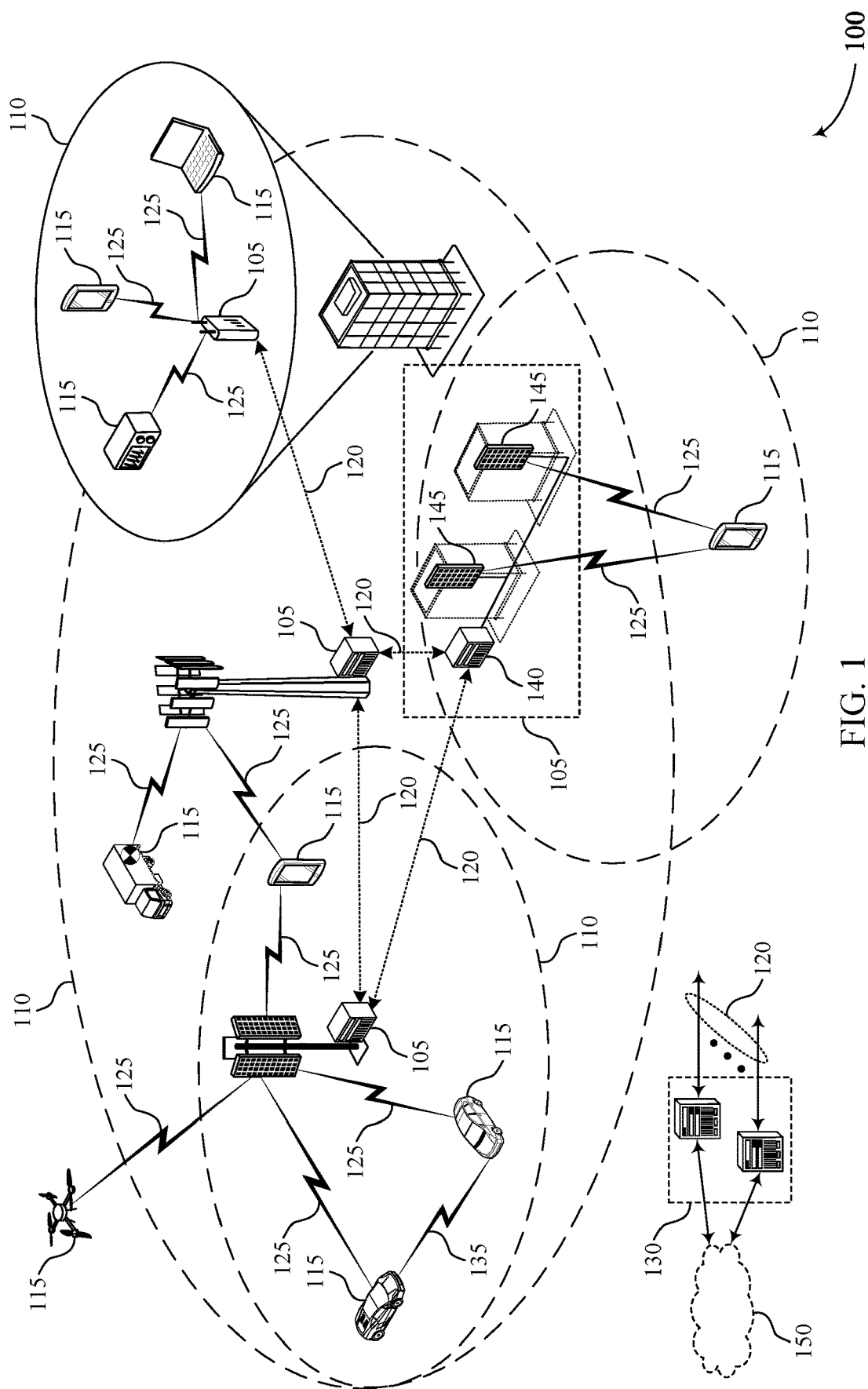
FIG. 1 illustrates an example of a wireless communications system that supports time domain CORESET design for single carrier (SC) waveforms in accordance with aspects of the present disclosure.

In accordance with various aspects discussed herein, some wireless communications systems may use relatively high frequency bands for communications between a base station and a user equipment (UE), or for communications between any two nodes of the system. Such relatively high frequency bands may include, for example, frequencies in the range of 52 GHz to 71 GHz, which may be referred to as frequency range 4 (FR4), or higher (e.g., FR5 frequencies of 95 GHz to 325 GHz, and beyond). Using such higher frequency bands may result relatively large amounts of signal attenuation over relatively short distances, which may necessitate beamforming with relatively narrow beams, may result in relatively large amounts of power consumption at UEs and base stations, may necessitate additional processing resources relative to transmissions in lower frequency bands, or any combinations thereof.

In some cases, in order to enhance energy efficiency, a single carrier (SC) waveform (e.g., a SC quadrature amplitude modulation (SC-QAM) waveform) may be used for communications at higher frequency bands. Such SC waveforms may provide higher power amplifier (PA) efficiency due to a lower peak-to-average power ratio (PAPR) of the SC waveforms. The higher PA efficiency, particularly at higher bands, may reduce power consumption at UEs and help extend battery life. In some cases, SC waveforms provide for frequency domain equalization (FDE) through cyclic prefixes (CPs) that are added through prefixing a symbol with an end portion of that symbol, where a duration of the CP may be configured by a base station. CPs may also provide for mitigation of inter-symbol interference (ISI), which may enhance decoding of a symbol. However, CP addition adds a significant amount of overhead, and various techniques as discussed herein provide for SC waveform transmissions without CPs for some communications, which may reduce the overhead associated with CPs and enhance communications efficiency.

In some cases, certain control channel communications, such as control resource set (CORESET) transmissions, may use a relatively low data rate with a lower SNR operating point, and thus FDE and ISI mitigation may not be needed in order for a UE to successfully decode the communications. In such cases, control information or CORESET transmissions may be transmitted without a CP, which may increase spectral efficiency and enhance network capacity. In some cases, a base station may signal to UEs whether CORESET or control information transmissions (e.g., physical downlink control channel (PDCCH) transmissions) use a SC waveform without a CP, and UEs may decode the CORESET or PDCCH based on the SC waveform without CP. In some cases, radio resource control (RRC) signaling may be used to provide configuration information for CORESET transmissions, or other PDCCH transmissions, that indicates that such transmissions are configured to have a CP or not. In some cases, downlink control information (DCI), a medium access control (MAC) control element (CE), or RRC signaling (or combinations thereof) may then be used to switch between a CP or non-CP SC waveform for control channel transmissions (e.g., for CORESET or PDCCH transmissions). In some cases, the control information may be non-uniformly segmented across two or more time domain blocks or two or more portions of a time domain block. Additionally or alternatively, a reference signal (e.g., a demodulation reference signal (DMRS)) may be transmitted in the two or more time domain blocks, where the reference signal may be distributed evenly or unevenly across the two or more time domain blocks.

Aspects of the disclosure are initially described in the context of wireless communications systems. Examples of time domain blocks and associated CP and reference signal resources are then discussed. Aspects of the disclosure are further illustrated by and described with reference to process flows, apparatus diagrams, system diagrams, and flowcharts that relate to time domain CORESET design for SC waveforms.

FIG. 1 illustrates an example of a wireless communications system 100 that supports time domain CORESET design for SC waveforms in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a base station 105 may configure a UE 115 for control information transmissions (e.g., CORESET transmissions) using a SC waveform without CPs in time domain blocks. The base station 105, based on such a configuration, may activate the SC waveform without CPs in time domain blocks for control information communications, and transmit the control information using the configured SC waveform. In some cases, the control information may be non-uniformly segmented across two or more time domain blocks or two or more portions of a time domain block. Additionally or alternatively, a reference signal (e.g., a DMRS) may be transmitted in the two or more time domain blocks, where the reference signal may be distributed evenly or unevenly across the two or more time domain blocks.

Figure 2:
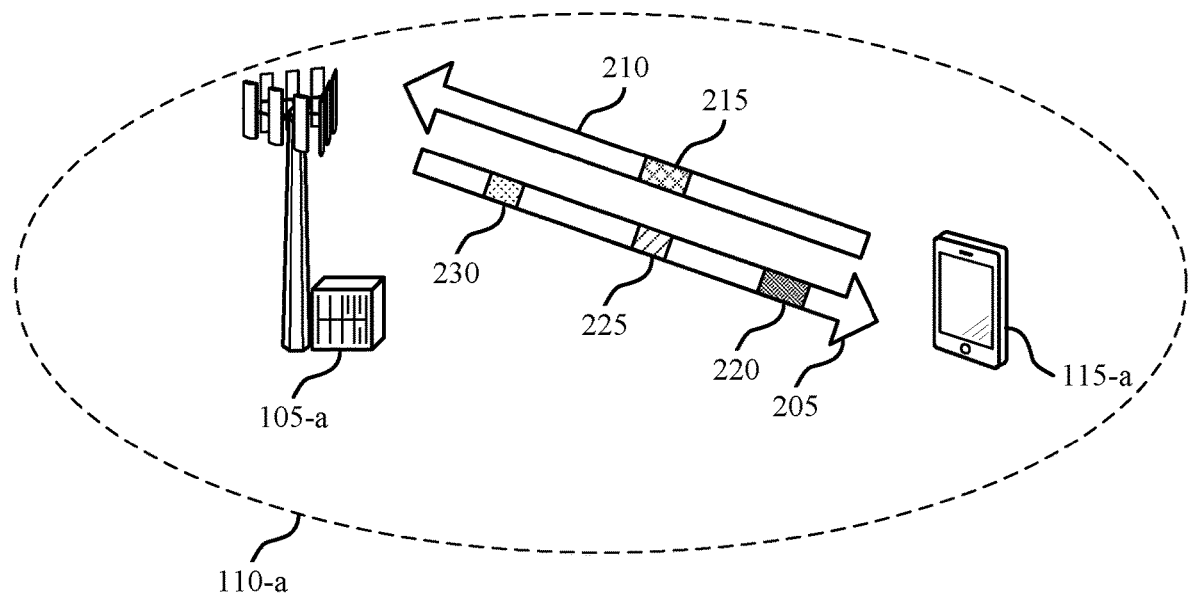
FIG. 2 illustrates an example of a portion of a wireless communications system that supports time domain CORESET design for SC waveforms in accordance with aspects of the present disclosure.

FIG. 2 illustrates an example of a wireless communications system 200 that supports time domain CORESET design for SC waveforms in accordance with aspects of the present disclosure. In some examples, the wireless communications system 200 may implement aspects of wireless communications system 100. Wireless communications system 200 may include UE 115-a that may be an example of a UE 115 as described with respect to FIG. 1, and base station 105-a that may be an example of a base station 105 as described with respect to FIG. 1. The base station 105-a may serve one or more UEs 115, including UE 115-a, within coverage area 110-a. The base station 105-a and UE 115-a in this example may exchange downlink and uplink communications using downlink carrier 205 and uplink carrier 210 (which may be a same carrier or different carriers).

As discussed herein, in some cases, UE 115-a and base station 105-a may be capable of supporting communications in relatively high frequency bands (e.g., FR4 communications or other higher band communications). In some cases, to support PA efficiency for such higher band communications, the base station 105-a and UE 115-a may implement SC waveforms for communications. Further, to help enhance spectral efficiency, in some cases, the base station 105-a may provide configuration information 220 to configure SC waveform transmissions in time domain blocks with or without CPs. In some cases, such configuration may be provided based on capability information 215 provided by the UE 115-a. The base station 105-a, based on one or more parameters such as channel conditions between the UE 115-a and base station 105-a, may activate or enable non-CP control information transmissions (e.g., CORESET transmissions using a SC waveform without a CP) in a non-CP transmission activation 230 that is transmitted to the UE 115-a (e.g., in one or more RRC, DCI, or MAC-CE transmissions). The base station 105-a may then transmit control information 230 in one or more time domain blocks (e.g., symbols or control channel elements (CCEs)) with or without a CP, based on the activation status of non-CP control information transmissions.

As discussed, SC waveform transmissions may enhance power efficiency at the UE 115-a, and in some cases, to facilitate frequency domain equalization (FDE), a CP may be introduced to create OFDM-like blocks or symbols. In some cases, a guard interval (GI), sometimes referred to as UW (unique word), may be considered as a special case of CP in this context. Although introduction of CP facilitates FDE in SC, it induces overhead, and techniques as discussed herein provide for flexibility on including CPs in cases where successful decoding may be performed in an absence of CPs. For example, in scenarios where the channel is inherently designed for low data rate transmission (e.g., PDCCH/PUCCH) or the delay spread is not large, the CP overhead may reduce spectral efficiency while not providing a corresponding enhancement in a likelihood of successful decoding. In such cases, time-domain processing of the SC waveform without the introduction of the CP may still maintain a good communication performance with increased spectral efficiency. Additionally, without CP, there may be ISI between different SC symbols, and in some cases activation of non-CP communications may further be based on a delay spread for communications between the UE 115-a and base station 105-a. For example, non-CP communications may be activated in cases where the delay spread is not large (e.g., less than a threshold value) or a transmission has a relatively low data rate, such that time-domain equalization results in acceptable performance with relatively low complexity.

Figure 3:
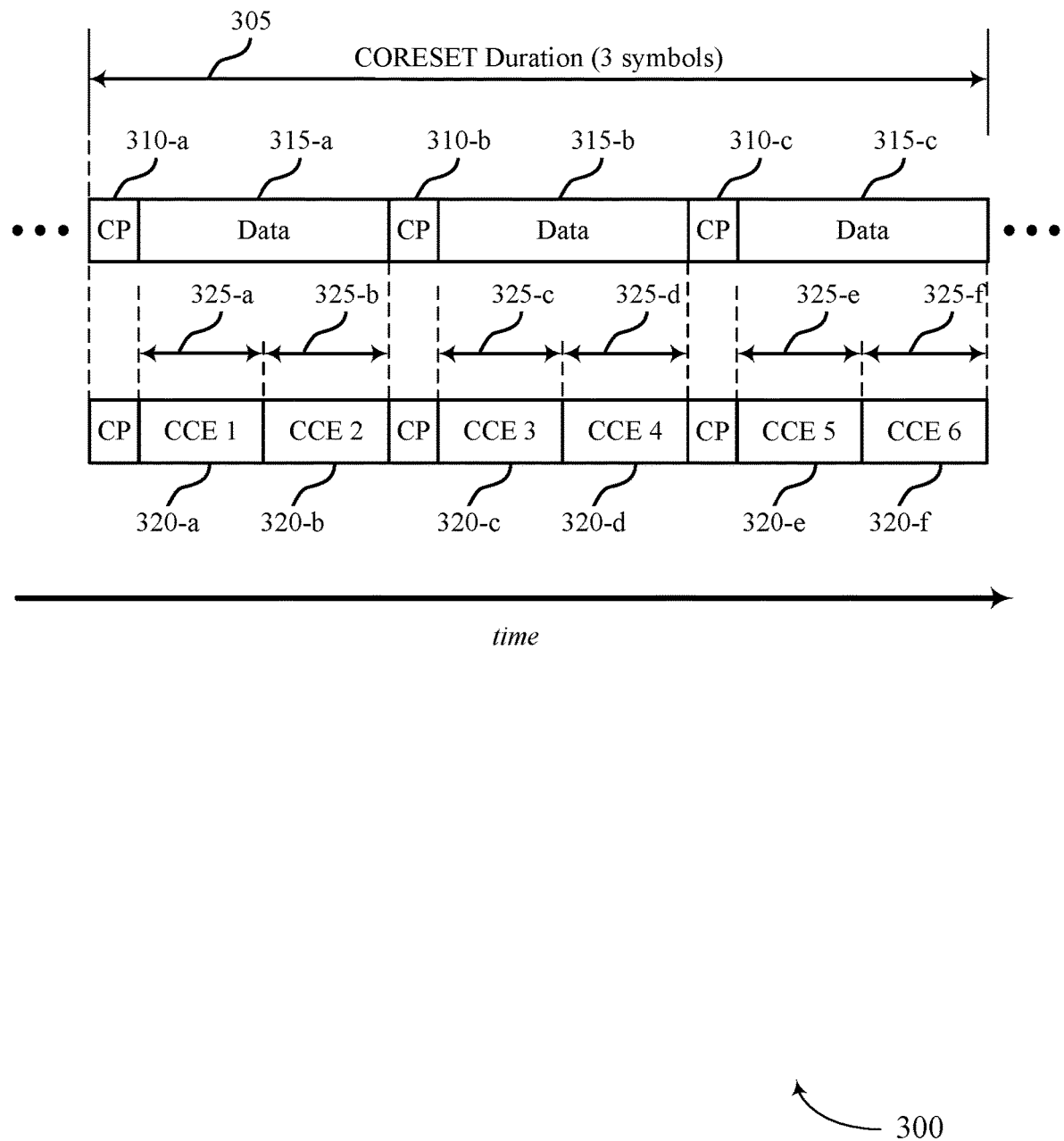
FIGS. 3 through 5 illustrate examples of resource configurations that support time domain CORESET design for SC waveforms in accordance with aspects of the present disclosure.
Figure 4:
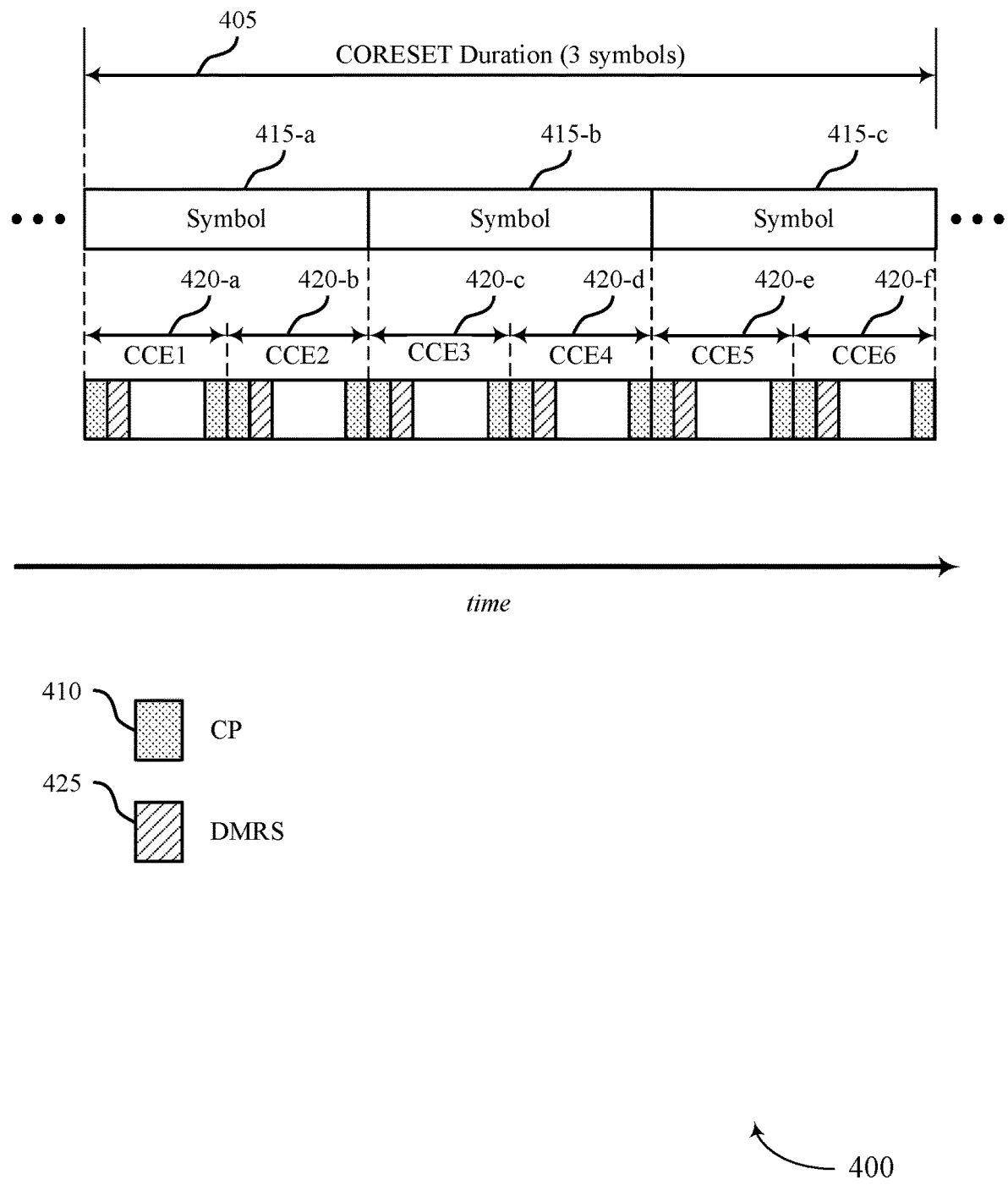
Figure 5:
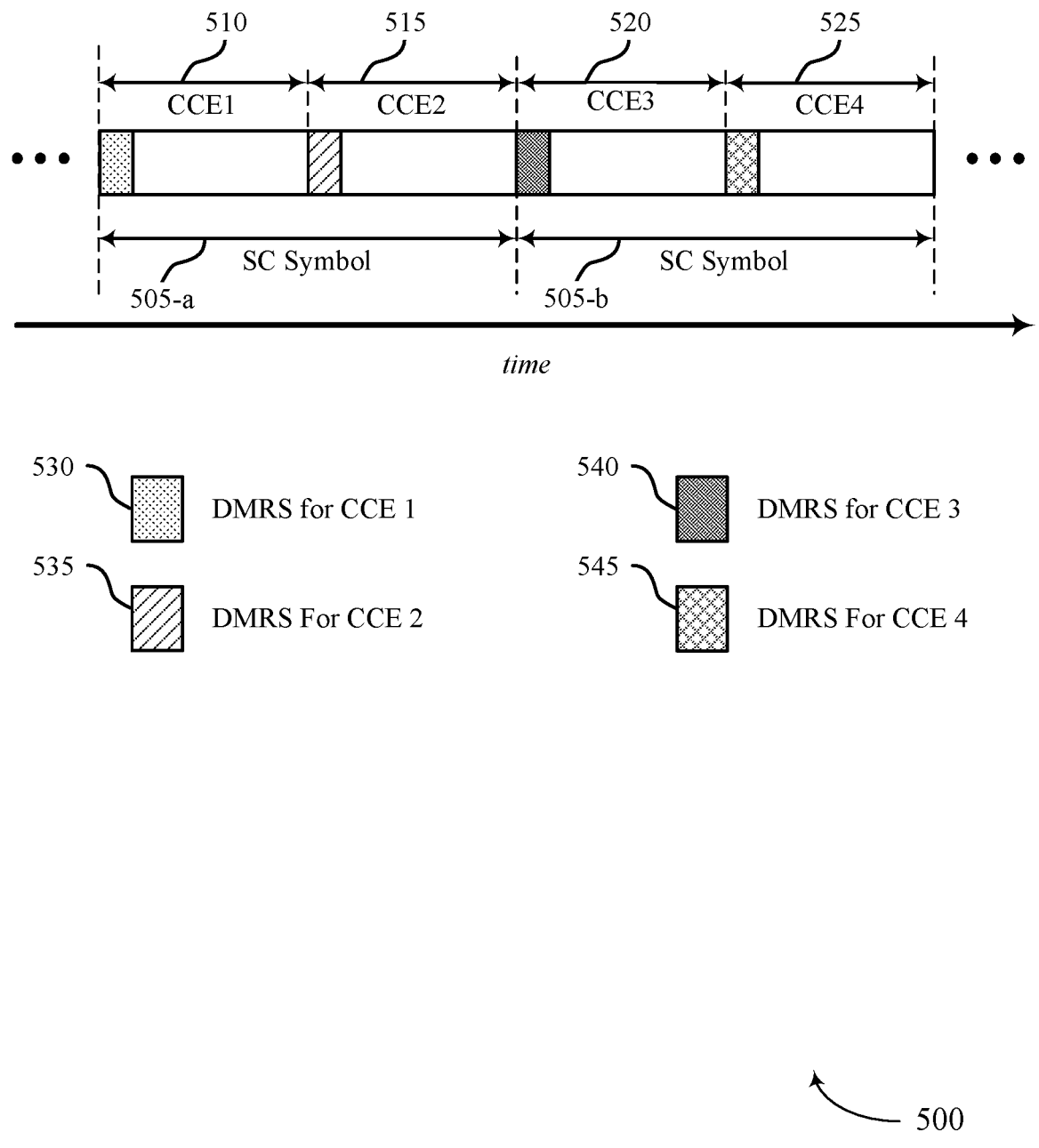

In some cases, in order to enhance decoding at the UE 115-a, the base station 105-a may aggregate control information 230 transmissions across multiple CCEs to meet SNR targets for decoding the control information 230, if necessary. In some cases, the aggregation level may be indicated in the configuration information 220, in the non-CP transmission activation 225, in other control information, or any combinations thereof. Additionally, in some cases disregarding CP may allow for non-uniform distribution of CCE segmentations within a symbol boundary or time domain block, which may provide for additional flexibility in selection of CCE size in a transmission (e.g., different CCE sizes may be selected based on the information included in the transmission). Further, such techniques may allow for a flexible distribution of the CCE's and their corresponding DMRS within a symbol or time domain block (e.g., due to no fast Fourier transform (FFT) size restrictions), and a cyclic distribution of DMRS for each CCE may not be necessary. FIGS. 3 through 5 illustrate various examples in which SC waveforms may be used to transmit information in accordance with various techniques discussed herein.

FIG. 3 illustrates an example of a resource configuration 300 that supports time domain CORESET design for SC waveforms in accordance with aspects of the present disclosure. In some examples, the resource configuration 300 may implement aspects of wireless communications system 100 or 200. In this example, CORESET resources may be configured with a CORESET duration 305 that spans three symbols. As discussed herein, in some cases a base station (e.g., a base station 105 of FIG. 1 or 2) may transmit control information using a SC waveform, which may be transmitted with or without a CP based on a configuration of the base station and one or more UEs (e.g., UEs 115 of FIG. 1 or 2).

In this example, each symbol of the CORESET duration 305 may include a CP 310 followed by data 315. In some cases, each symbol may include two CCEs 320 that span a portion of the time domain resources 325 of each symbol. A UE may use CCEs and search space (SS) sets in time domain for SC waveform communications to identify control information, such as a CORESET transmission of the base station, in which one or more symbols (e.g., three symbols in the example if FIG. 3, having a same bandwidth) can be bundled to form a time domain CORESET. In this example, the CORESET can be divided into time-domain CCEs 320, with a CP 310 associated with each symbol. DMRS samples may be assigned on each CCE 320 for per-CCE channel estimation. The UE may aggregate CCEs 320 to form a PDCCH candidate. A UE may use both frequency domain equalization (FDE) and time domain equalization (TDE) to receive the CCE 320, although FDE may necessitate the introduction of CP to the DMRS of each CCE 320, as discussed with reference to the example of FIG. 4.

FIG. 4 illustrates an example of a resource configuration 400 that supports time domain CORESET design for SC waveforms in accordance with aspects of the present disclosure. In some examples, the resource configuration 400 may implement aspects of wireless communications system 100 or 200. In this example, CORESET resources may be configured with a CORESET duration 405 that again spans three symbols. As discussed herein, in some cases a base station (e.g., a base station 105 of FIG. 1 or 2) may transmit control information using a SC waveform, which may be transmitted with or without a CP based on a configuration of the base station and one or more UEs (e.g., UEs 115 of FIG. 1 or 2).

In this example, each symbol 415 of the CORESET duration 405 may include two CCEs 420 that each span a time domain block. Each CCE 420, in this example, may include a CP 410 and a DMRS 425. Such a configuration may allow for FDE at the UE, and transmissions that include CPs 410 and DMRSs 425 per CCE 420 may be used in cases where channel conditions would not support reliable transmissions without CPs 410. Such a time domain CORESET design for SC applies CP 410 to both the DMRS 425 of CCEs 420 and to the SC symbols 415. Further, CCEs 420 may be designed to have a relatively short time duration which makes the CP 410 overhead more significant with relatively little performance improvement. Thus, while such a resource configuration may provide reliable control information transmissions, the overhead associated with CPs 410 and DMRSs 425 may be relatively high. Further, applying CPs 410 in a time domain CORESET for SC may result in reduced flexibility of CCE 420 segmentation within a SC symbol 415 due to the size of the CCE 420 being restricted by the FFT size. In cases where channel conditions and data rates may support TDE and decoding of CCEs 420 that do not include CPs 410, the base station may transmit control information without CPs 410, as discussed with reference to various aspects herein and illustrated in FIG. 5. Such techniques may provide a more spectrally efficient and flexible time domain CORESET design for SC waveforms.

FIG. 5 illustrates an example of a resource configuration 500 that supports time domain CORESET design for SC waveforms in accordance with aspects of the present disclosure. In some examples, the resource configuration 500 may implement aspects of wireless communications system 100 or 200. In this example, CORESET resources may be configured with a CORESET duration that spans two SC symbols 505, where the CORESET (or other control information) is transmitted without a CP. As discussed herein, in some cases a base station (e.g., a base station 105 of FIG. 1 or 2) may configure a UE (e.g., UEs 115 of FIG. 1 or 2) for control information transmissions using a SC waveform without a CP.

In this example, each SC symbol 505 may include two CCEs, such that a first CCE 510 and a second CCE 515 are in a first SC symbol 505-*a*, and a third CCE 520 and a fourth CCE 525 are in a second SC symbol 505-*b*. Each CCE 510 through 525 may be a time domain block, in which the first CCE 510 includes a first DMRS 530, the second CCE 515 includes a second DMRS 535, the third CCE 520 includes a third DMRS 540, and the fourth CCE 525 includes a fourth DMRS 545. Although two SC symbols 505 and four CCEs 510 through 525 are illustrated in FIG. 5, other examples may include more or fewer SC symbols, more of fewer CCEs, or any combinations there. In this example, the control information is transmitted without a CP, which may provide enhanced spectral efficiency. In some cases, transmissions without CP may be enabled based on communications (e.g., control channel transmissions that may include CORESET information) operating at a lower SNR operating point and/or lower code rate, and thus removing CP results in a higher spectrally efficient design while maintaining acceptable performance. Additionally, in some cases, control information may be aggregated across CCEs 510 through 525 to meet the SNR requirements for decoding the control information (e.g., for decoding a PDCCH transmission), if necessary. In some cases, the aggregation level may be indicated in configuration information, in a non-CP transmission activation, in other control information, or any combinations thereof. Additionally, in some cases disregarding CP may allow for non-uniform distribution of CCE segmentations within a SC symbol 505 boundary, which may provide for additional flexibility in selection of CCE size in a transmission (e.g., the first CCE 510 may have a different size than the second CCE 515). Further, such techniques may allow for a flexible distribution of the CCEs 510 through 525 and their corresponding DMRS 530 through 545 within a SC symbol 505 (e.g., due to no fast Fourier transform (FFT) size restrictions), and a cyclic distribution of DMRS for each CCE may not be necessary.

Figure 6:
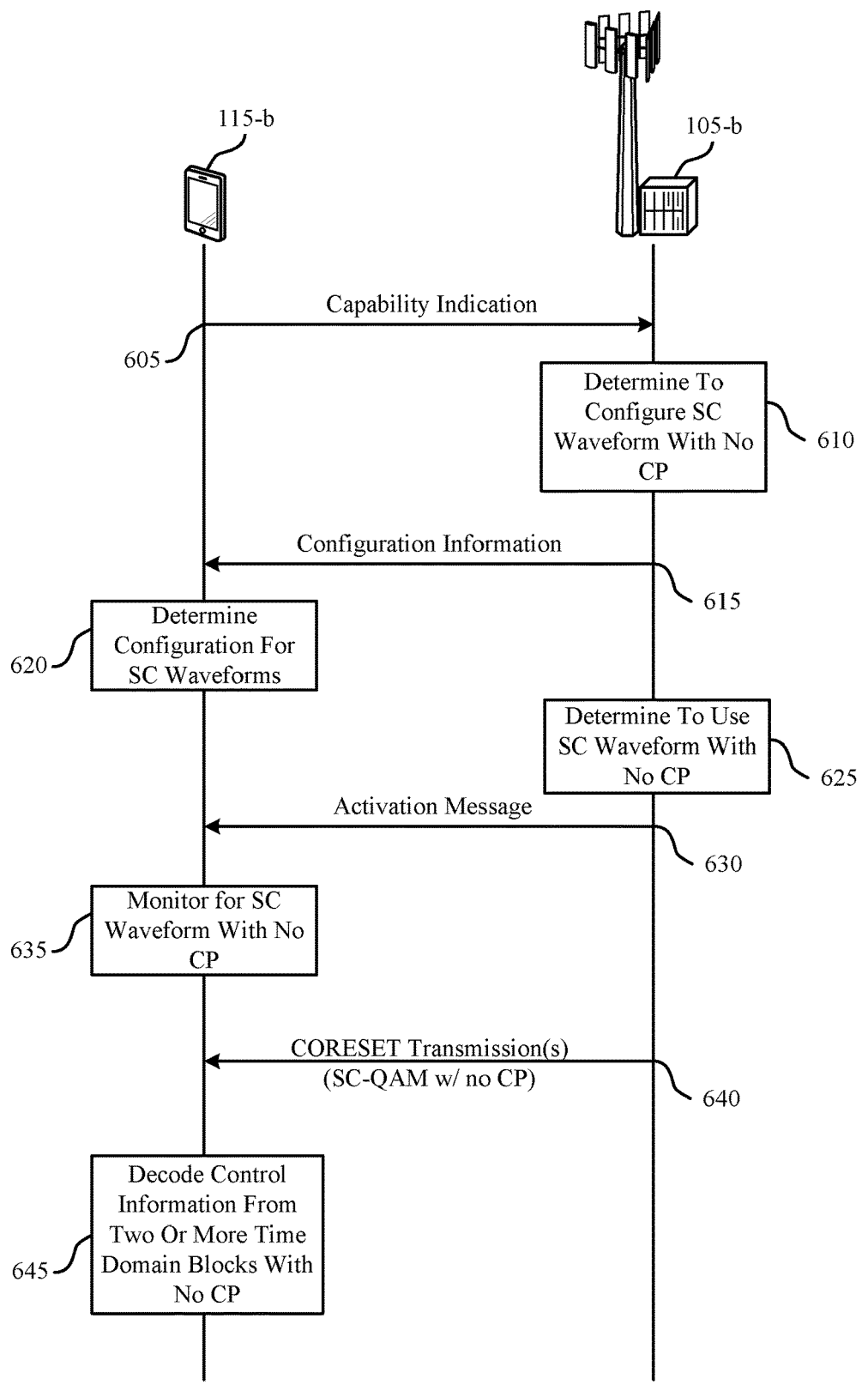
FIG. 6 illustrates an example of a process flow that supports time domain CORESET design for SC waveforms in accordance with aspects of the present disclosure.

FIG. 6 illustrates an example of a process flow 600 that supports time domain CORESET design for SC waveforms in accordance with aspects of the present disclosure. In some examples, the process flow 600 may implement aspects of a wireless communications systems 100 or 200, as described with reference to FIGS. 1 and 2. The process flow 600 may include a UE 115-*b* and a base station 105-*b* which may be examples of the corresponding devices described herein. Alternative examples of the following may be implemented where some processes are performed in a different order than described or not performed at all. In some implementations, processes may include additional features not mentioned below, or further processes may be added.

At 605, the UE 115-*b* may transmit a capability indication to the base station 105-*b*. In some cases, the capability indication may indicate that the UE 115-*b* has a capability to support higher frequency bands (e.g., that the UE 115-*b* supports communications in FR4), and transmissions using SC waveforms without CP. In some cases, the capability indication may be provided along with other UE 115-*b* capabilities in RRC signaling, as part of a connection establishment between the UE 115-*b* and base station 105-*b*.

At 610, the base station 105-*b* may determine to configure a SC waveform with no CP for control information communications with the UE 115-*b*. In some cases, such a determination may be made based on the UE 115-*b* capability, channel conditions that are present between the UE 115-*b* and base station 105-*b*, an amount of traffic that is present for communications with the UE 115-*b* and other served UEs, a reliability target associated with communications with the UE 115-*b* (e.g., a large amount of high reliability communications may prompt the base station 105-*b* to use CPs for control information transmissions and a relatively low amount of high reliability communications may prompt the base station 105-*b* to transmit control information without CPs), or any combinations thereof. In some cases, the base station 105-*a* may determine an aggregation level for control information transmissions using SC waveforms without a CP (e.g., based on channel conditions between the UE 115-b and the base station 105-*b*). At 615, the base station 105-*b* may transmit configuration information to the UE 115-*b*, which may include information related to the SC waveforms without a CP, an aggregation level used for the control information, CCE segment sizes for the control information, or any combinations thereof.

At 620, the UE 115-*b* may determine a configuration for control information communications using SC waveforms, based at least in part on the configuration information provided by the base station 105-*b*. In some cases, the UE 115-*b* may determine that control information transmissions without a CP are to be used for communications with the base station 105-*b*. In other cases, the UE 115-*b* may determine that control information transmissions with a CP are to be used, until a separate activation message is received. In further cases, the UE 115-*b* may determine that control information transmissions without a CP are to be used based on measured channel conditions (e.g., if one or more parameters associated with channel conditions, such as SNR, reference signal received power (RSRP), etc., meet one or more associated threshold criteria).

At 625, the base station 105-*b* may determine to transmit control information using SC waveforms without a CP. The base station 105-*a* may make such a determination based on various parameters as discussed herein such as, for example, the UE 115-*b* capability, channel conditions, an amount/type of traffic, and the like. At 630, the base station 105-*b* may transmit an activation message to the UE 115-*b* to activate control information transmissions that do not include a CP. In some cases, the activation message may be transmitted in RRC signaling, in a MAC-CE, in DCI, or any combinations thereof. In some cases, activation message may include information on an aggregation level for the control information, CCE segment sizes for the control information, or any combinations thereof.

At 635, the UE 115-*b* may monitor for control information transmissions on search space candidates that are configured for control information transmissions. At 640, the base station 105-*b* may transmit CORESET transmission(s), where the transmissions do not include a CP (e.g., using SC-QAM). At 645, the UE 115-*b* may decode the control information from two or more time domain blocks that do not include a CP. In some cases, the UE 115-*b* may decode time domain blocks of search spaces using TDE to determine if control information is present.

Figure 7:
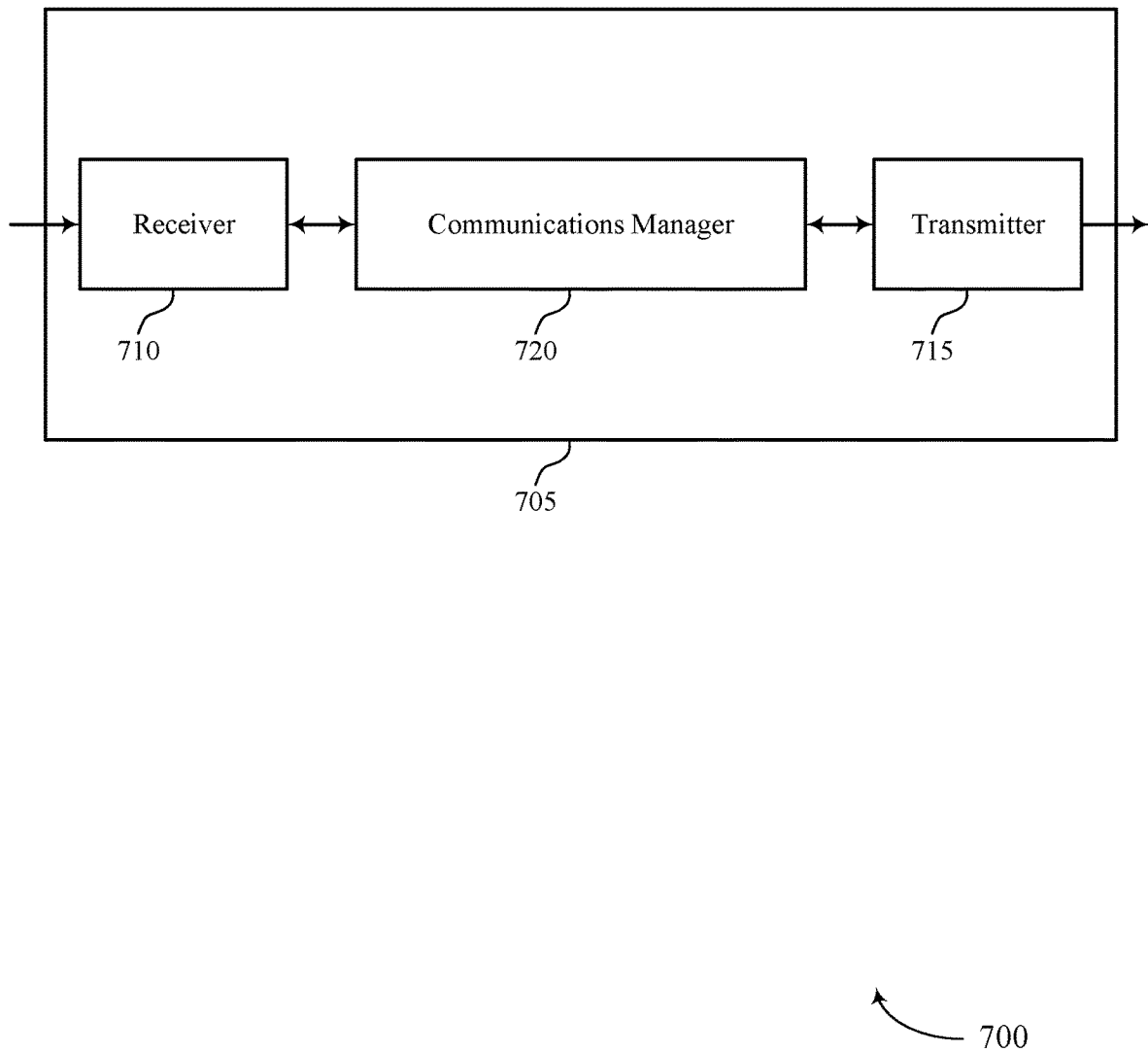
FIGS. 7 and 8 show block diagrams of devices that support time domain CORESET design for SC waveforms in accordance with aspects of the present disclosure.

FIG. 7 shows a block diagram 700 of a device 705 that supports time domain CORESET design for SC waveforms in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to time domain CORESET design for SC waveforms). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to time domain CORESET design for SC waveforms). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of time domain CORESET design for SC waveforms as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, an indication that control information is transmitted using a SC waveform in two or more time domain blocks, each of the two or more time domain blocks without a cyclic prefix. The communications manager 720 may be configured as or otherwise support a means for receiving, according to the indication, the two or more time domain blocks via the SC waveform. The communications manager 720 may be configured as or otherwise support a means for decoding the control information from the two or more time domain blocks.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for control information or CORESET transmissions using a SC waveform without a CP, which may increase spectral efficiency enhance network capacity, reduce power consumption, and provide more efficient utilization of communication resources.

Figure 8:
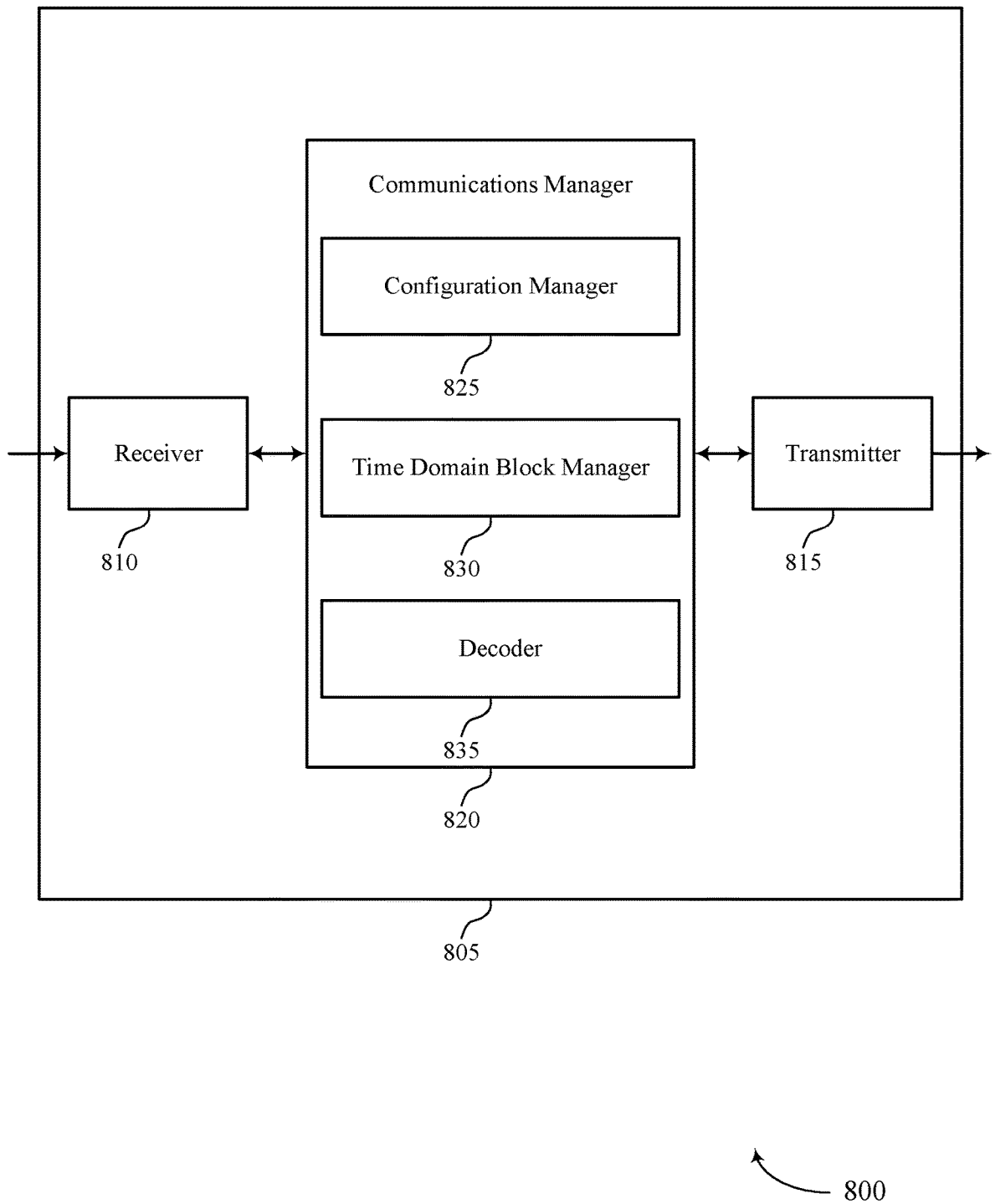

FIG. 8 shows a block diagram 800 of a device 805 that supports time domain CORESET design for SC waveforms in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to time domain CORESET design for SC waveforms). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to time domain CORESET design for SC waveforms). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of time domain CORESET design for SC waveforms as described herein. For example, the communications manager 820 may include a configuration manager 825, a time domain block manager 830, a decoder 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The configuration manager 825 may be configured as or otherwise support a means for receiving, from a base station, an indication that control information is transmitted using a SC waveform in two or more time domain blocks, each of the two or more time domain blocks without a cyclic prefix. The time domain block manager 830 may be configured as or otherwise support a means for receiving, according to the indication, the two or more time domain blocks via the SC waveform. The decoder 835 may be configured as or otherwise support a means for decoding the control information from the two or more time domain blocks.

Figure 9:
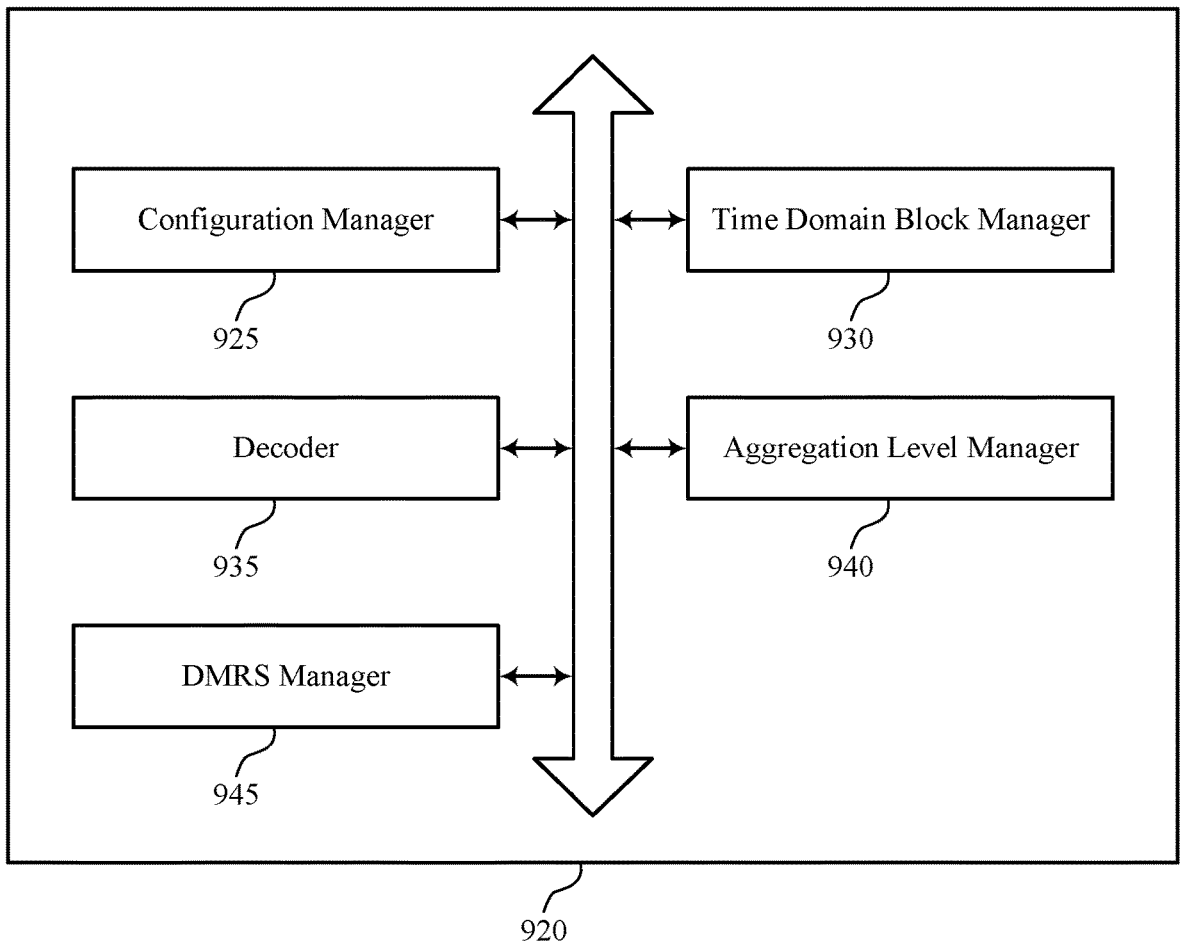
FIG. 9 shows a block diagram of a communications manager that supports time domain CORESET design for SC waveforms in accordance with aspects of the present disclosure.

FIG. 9 shows a block diagram 900 of a communications manager 920 that supports time domain CORESET design for SC waveforms in accordance with aspects of the present disclosure. The communications manager 920 may be an example of aspects of a communications manager 720, a communications manager 820, or both, as described herein. The communications manager 920, or various components thereof, may be an example of means for performing various aspects of time domain CORESET design for SC waveforms as described herein. For example, the communications manager 920 may include a configuration manager 925, a time domain block manager 930, a decoder 935, an aggregation level manager 940, a DMRS manager 945, or any combination thereof. Each of these components may communicate, directly or indirectly, with one another (e.g., via one or more buses).

The communications manager 920 may support wireless communication at a UE in accordance with examples as disclosed herein. The configuration manager 925 may be configured as or otherwise support a means for receiving, from a base station, an indication that control information is transmitted using a SC waveform in two or more time domain blocks, each of the two or more time domain blocks without a cyclic prefix. The time domain block manager 930 may be configured as or otherwise support a means for receiving, according to the indication, the two or more time domain blocks via the SC waveform. The decoder 935 may be configured as or otherwise support a means for decoding the control information from the two or more time domain blocks. In some examples, the control information is transmitted in two or more CCEs in the two or more time domain blocks.

In some examples, the aggregation level manager 940 may be configured as or otherwise support a means for receiving an aggregation level for control information that is transmitted without a cyclic prefix, and where the decoding is further based on the aggregation level.

In some examples, the control information is non-uniformly segmented across the two or more CCEs in the two or more time domain blocks. In some examples, each CCE has an associated DMRS that is transmitted in a corresponding time domain block. In some examples, two or more DMRSs are non-uniform across the two or more time domain blocks. In some examples, each CCE and associated DMRS are distributed in the two or more time domain blocks based on time domain parameters without any FFT size restrictions.

In some examples, to support receiving the indication, the configuration manager 925 may be configured as or otherwise support a means for receiving RRC signaling that includes one or more parameters associated with control information transmissions. In some examples, the time domain block manager 930 may be configured as or otherwise support a means for receiving, subsequent to receiving the indication, a message that enables the decoding of the control information from the two or more time domain blocks based on each of the two or more time domain blocks being transmitted without a cyclic prefix. In some examples, the message is received in one or more of a MAC-CE, a DCI transmission, RRC signaling, or any combinations thereof.

Figure 10:
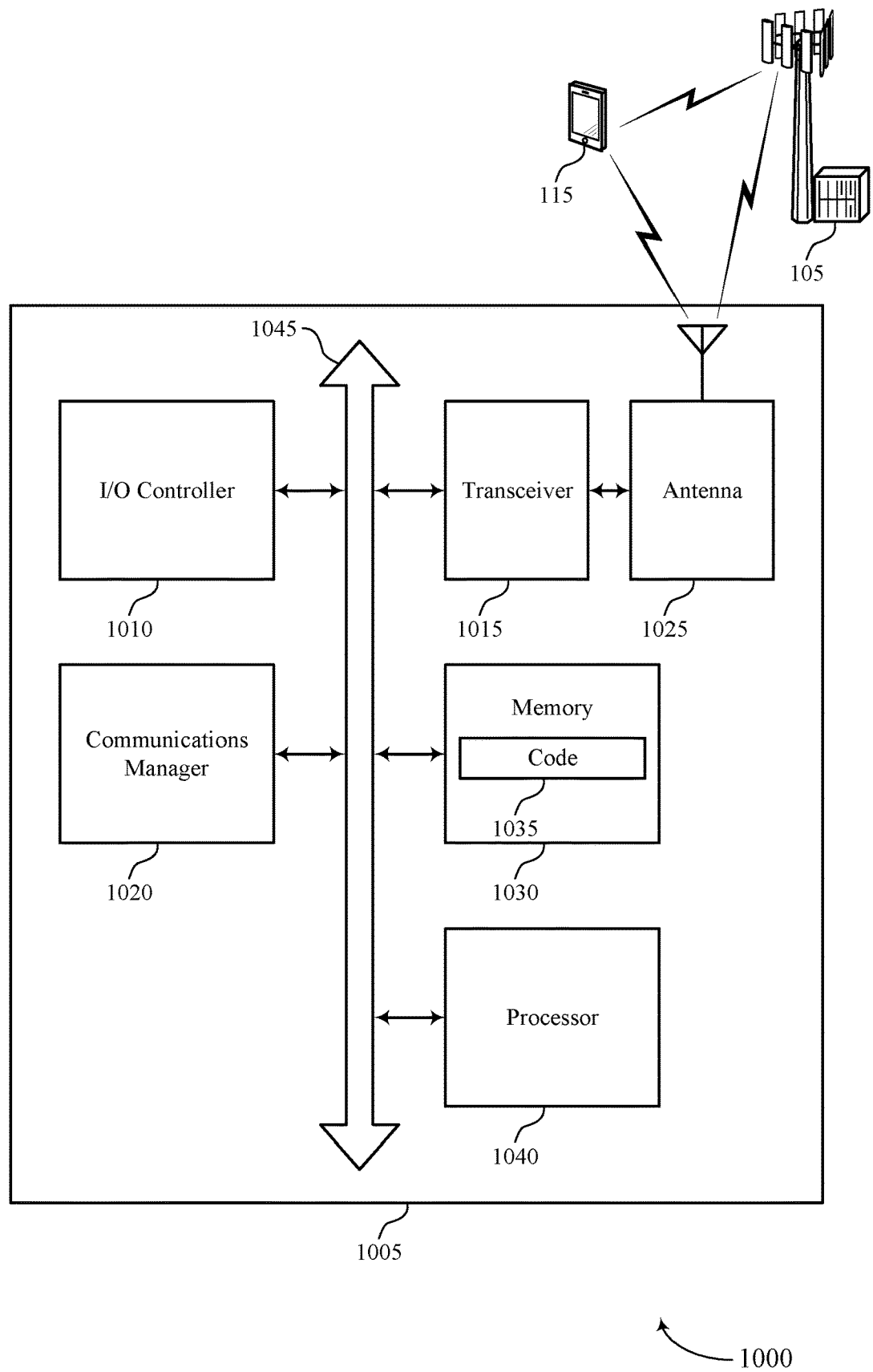
FIG. 10 shows a diagram of a system including a device that supports time domain CORESET design for SC waveforms in accordance with aspects of the present disclosure.

FIG. 10 shows a diagram of a system 1000 including a device 1005 that supports time domain CORESET design for SC waveforms in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting time domain CORESET design for SC waveforms). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, an indication that control information is transmitted using a SC waveform in two or more time domain blocks, each of the two or more time domain blocks without a cyclic prefix. The communications manager 1020 may be configured as or otherwise support a means for receiving, according to the indication, the two or more time domain blocks via the SC waveform. The communications manager 1020 may be configured as or otherwise support a means for decoding the control information from the two or more time domain blocks.

By including or configuring the communications manager 1020 in accordance with examples as described herein, the device 1005 may support techniques for control information or CORESET transmissions using a SC waveform without a CP, which may increase spectral efficiency enhance network capacity, reduce power consumption, provide more efficient utilization of communication resources, and provide improved user experience related to reduced processing, reduced power consumption, more efficient utilization of communication resources, and longer battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of time domain CORESET design for SC waveforms as described herein, or the processor 1040 and the memory 1030 may be otherwise configured to perform or support such operations.

Figure 11:
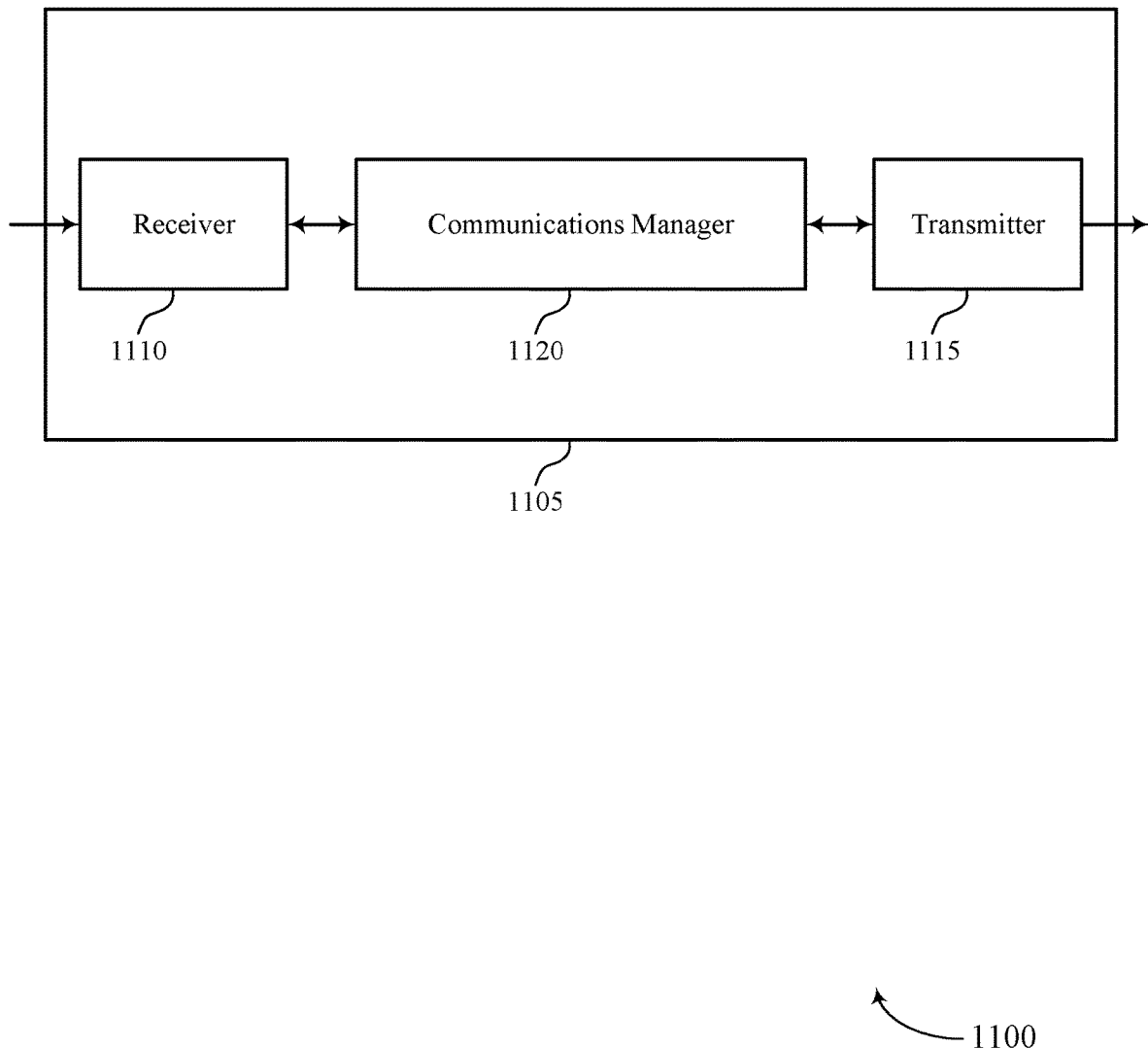
FIGS. 11 and 12 show block diagrams of devices that support time domain CORESET design for SC waveforms in accordance with aspects of the present disclosure.

FIG. 11 shows a block diagram 1100 of a device 1105 that supports time domain CORESET design for SC waveforms in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to time domain CORESET design for SC waveforms). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to time domain CORESET design for SC waveforms). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of time domain CORESET design for SC waveforms as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, an indication that a control information transmission uses a SC waveform in two or more time domain blocks, each of the two or more time domain blocks without a cyclic prefix. The communications manager 1120 may be configured as or otherwise support a means for determining to enable the control information transmissions that use the SC waveform in two or more time domain blocks without cyclic prefix. The communications manager 1120 may be configured as or otherwise support a means for transmitting, to the UE, the control information in the two or more time domain blocks without cyclic prefix using the SC waveform.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for control information or CORESET transmissions using a SC waveform without a CP, which may increase spectral efficiency enhance network capacity, reduce power consumption, and provide more efficient utilization of communication resources.

Figure 12:
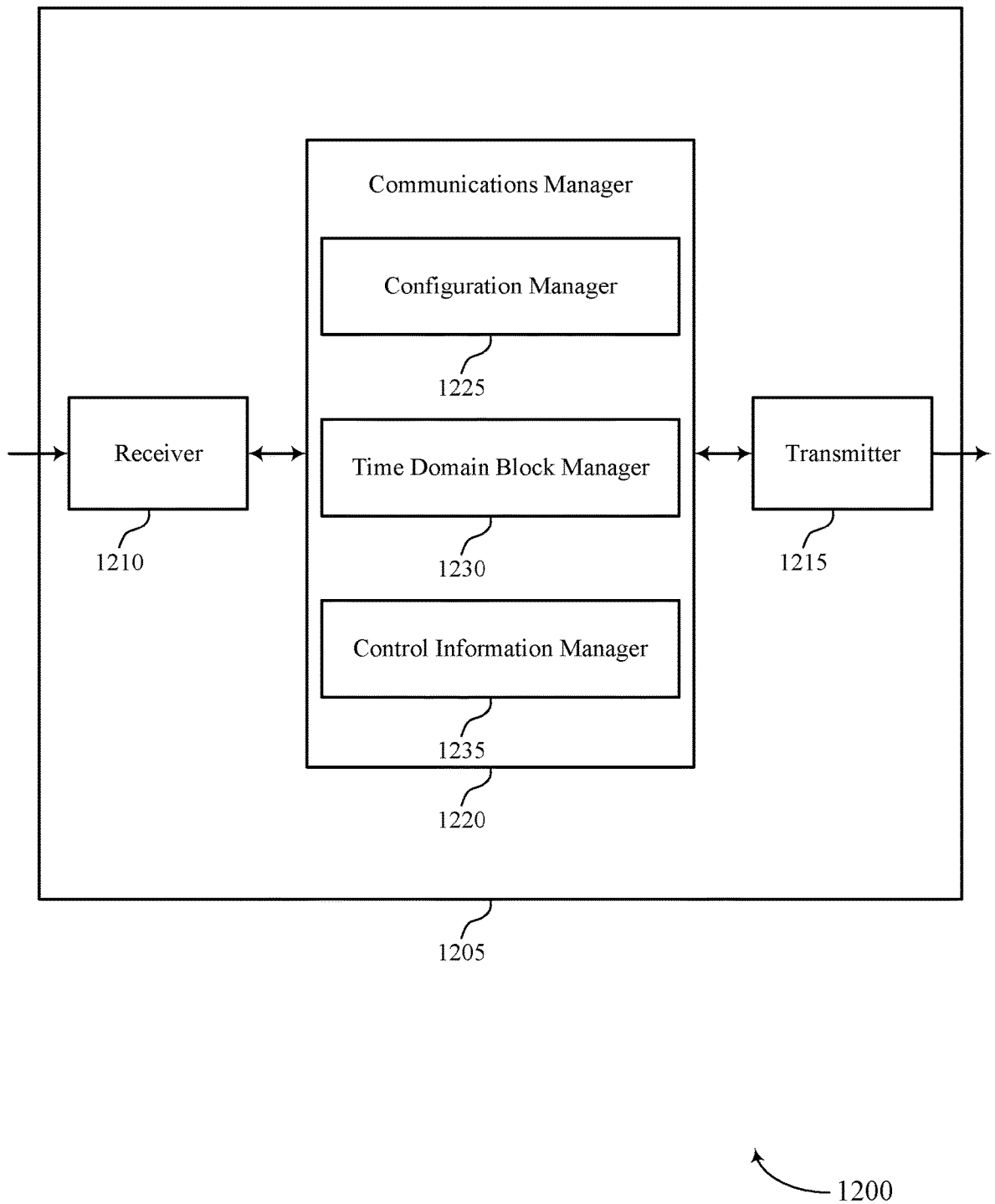

FIG. 12 shows a block diagram 1200 of a device 1205 that supports time domain CORESET design for SC waveforms in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to time domain CORESET design for SC waveforms). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to time domain CORESET design for SC waveforms). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of time domain CORESET design for SC waveforms as described herein. For example, the communications manager 1220 may include a configuration manager 1225, a time domain block manager 1230, a control information manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The configuration manager 1225 may be configured as or otherwise support a means for transmitting, to a UE, an indication that a control information transmission uses a SC waveform in two or more time domain blocks, each of the two or more time domain blocks without a cyclic prefix. The time domain block manager 1230 may be configured as or otherwise support a means for determining to enable the control information transmissions that use the SC waveform in two or more time domain blocks without cyclic prefix. The control information manager 1235 may be configured as or otherwise support a means for transmitting, to the UE, the control information in the two or more time domain blocks without cyclic prefix using the SC waveform.

Figure 13:
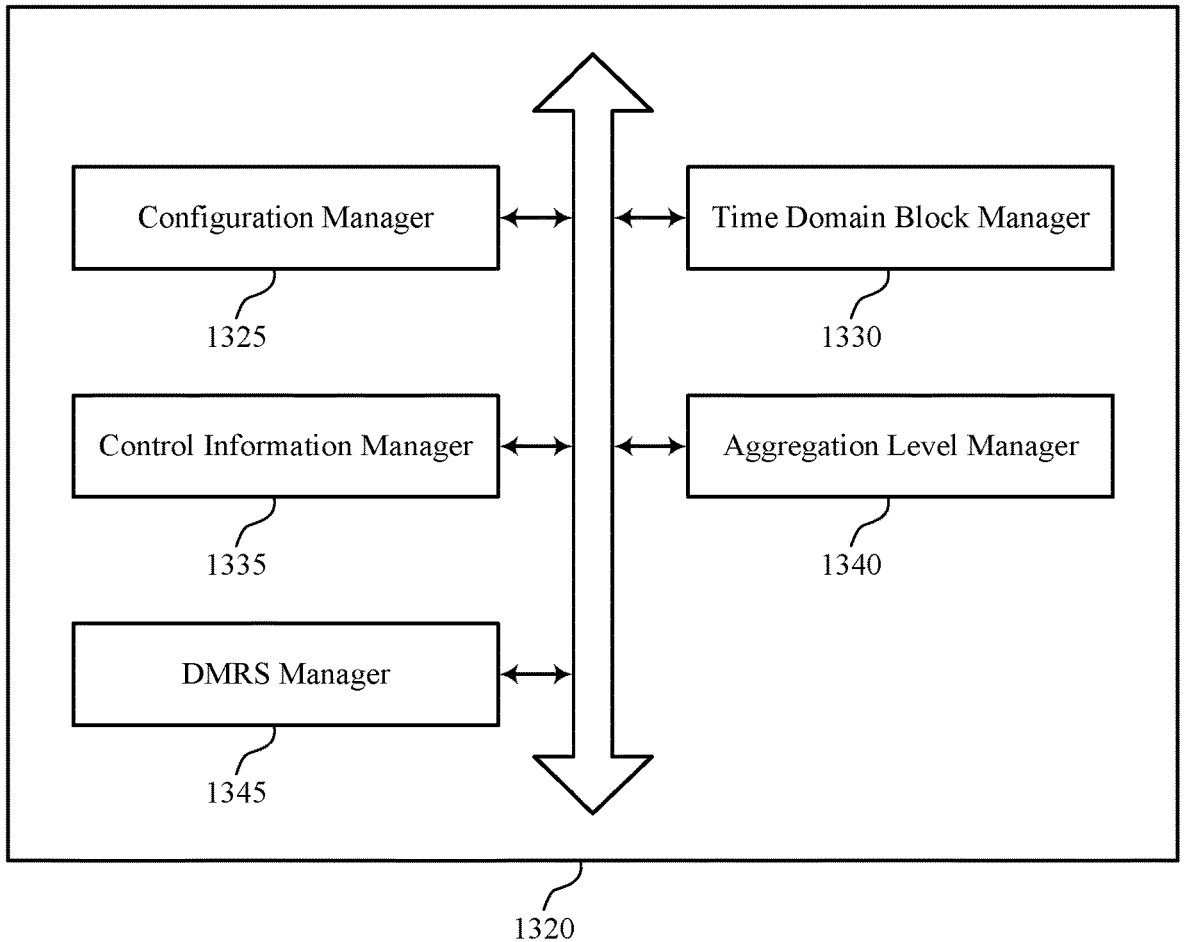
FIG. 13 shows a block diagram of a communications manager that supports time domain CORESET design for SC waveforms in accordance with aspects of the present disclosure.

FIG. 13 shows a block diagram 1300 of a communications manager 1320 that supports time domain CORESET design for SC waveforms in accordance with aspects of the present disclosure. The communications manager 1320 may be an example of aspects of a communications manager 1120, a communications manager 1220, or both, as described herein.

The communications manager 1320, or various components thereof, may be an example of means for performing various aspects of time domain CORESET design for SC waveforms as described herein. For example, the communications manager 1320 may include a configuration manager 1325, a time domain block manager 1330, a control information manager 1335, an aggregation level manager 1340, a DMRS manager 1345, or any combination thereof. Each of these components may communicate, directly or indirectly, with one another (e.g., via one or more buses).

The communications manager 1320 may support wireless communication at a base station in accordance with examples as disclosed herein. The configuration manager 1325 may be configured as or otherwise support a means for transmitting, to a UE, an indication that a control information transmission uses a SC waveform in two or more time domain blocks, each of the two or more time domain blocks without a cyclic prefix. The time domain block manager 1330 may be configured as or otherwise support a means for determining to enable the control information transmissions that use the SC waveform in two or more time domain blocks without cyclic prefix. The control information manager 1335 may be configured as or otherwise support a means for transmitting, to the UE, the control information in the two or more time domain blocks without cyclic prefix using the SC waveform.

In some examples, the control information is transmitted in two or more control channel elements (CCEs) in the two or more time domain blocks. In some examples, the indication further provides an aggregation level for control information that is transmitted without a cyclic prefix. In some examples, the control information is non-uniformly segmented across the two or more CCEs. In some examples, each CCE has an associated DMRS that is transmitted in a corresponding time domain block. In some examples, two or more DMRSs are non-uniform across the two or more time domain blocks. In some examples, each CCE and associated DMRS are distributed in the two or more time domain blocks based on time domain parameters without any fast Fourier transform (FFT) size restrictions.

In some examples, to support transmitting the indication, the configuration manager 1325 may be configured as or otherwise support a means for transmitting RRC signaling that includes one or more parameters associated with control information transmissions. In some examples, the time domain block manager 1330 may be configured as or otherwise support a means for transmitting, subsequent to transmitting the RRC signaling, a message to the UE to enable transmission of the control information using the SC waveform in the two or more time domain blocks without a cyclic prefix. In some examples, the message is transmitted in one or more of a MAC-CE, a DCI transmission, RRC signaling, or any combinations thereof.

Figure 14:
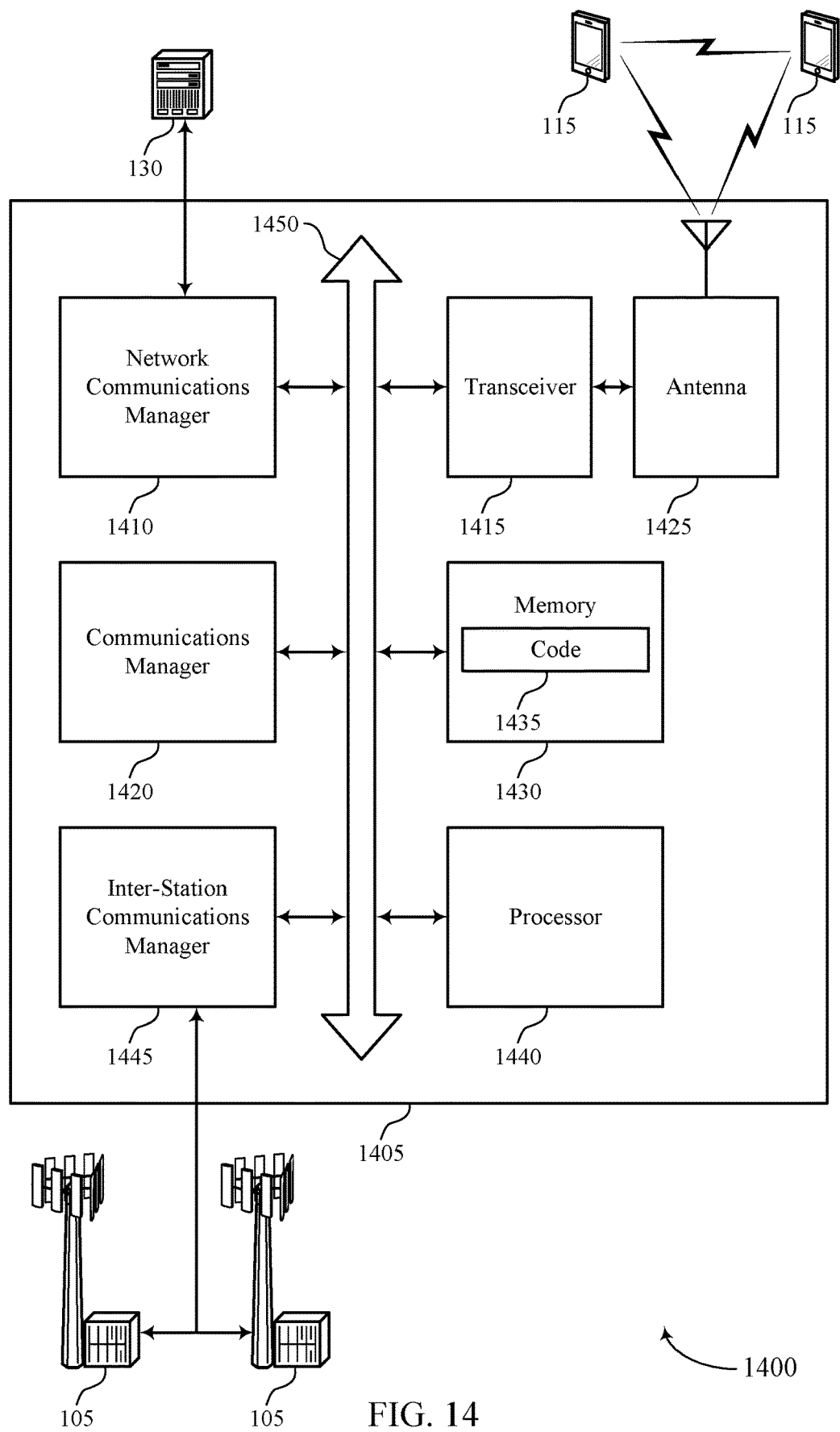
FIG. 14 shows a diagram of a system including a device that supports time domain CORESET design for SC waveforms in accordance with aspects of the present disclosure.

FIG. 14 shows a diagram of a system 1400 including a device 1405 that supports time domain CORESET design for SC waveforms in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting time domain CORESET design for SC waveforms). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, an indication that a control information transmission uses a SC waveform in two or more time domain blocks, each of the two or more time domain blocks without a cyclic prefix. The communications manager 1420 may be configured as or otherwise support a means for determining to enable the control information transmissions that use the SC waveform in two or more time domain blocks without cyclic prefix. The communications manager 1420 may be configured as or otherwise support a means for transmitting, to the UE, the control information in the two or more time domain blocks without cyclic prefix using the SC waveform.

By including or configuring the communications manager 1420 in accordance with examples as described herein, the device 1405 may support techniques for control information or CORESET transmissions using a SC waveform without a CP, which may increase spectral efficiency enhance network capacity, reduce power consumption, and provide more efficient utilization of communication resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of time domain CORESET design for SC waveforms as described herein, or the processor 1440 and the memory 1430 may be otherwise configured to perform or support such operations.

Figure 15:
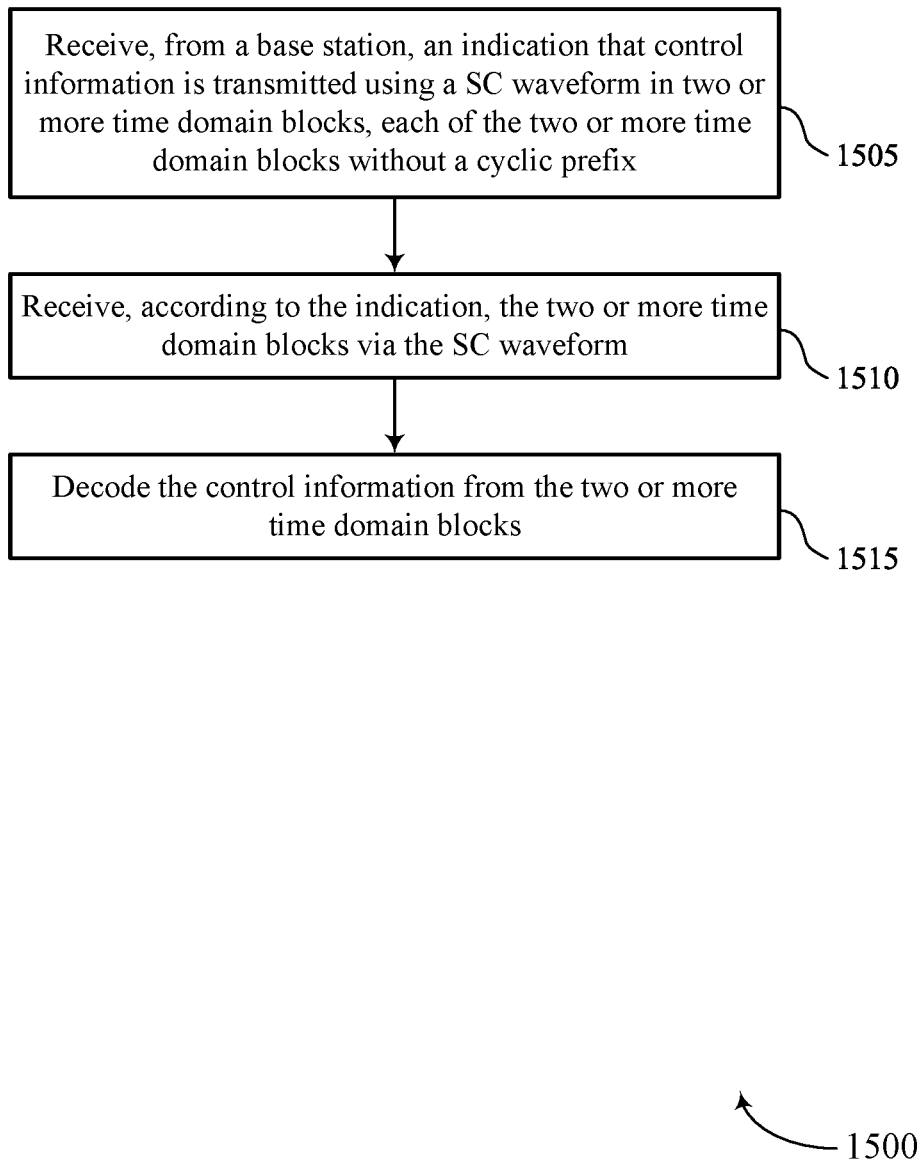
FIGS. 15 through 19 show flowcharts illustrating methods that support time domain CORESET design for SC waveforms in accordance with aspects of the present disclosure.

FIG. 15 shows a flowchart illustrating a method 1500 that supports time domain CORESET design for SC waveforms in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication that control information is transmitted using a SC waveform in two or more time domain blocks, each of the two or more time domain blocks without a cyclic prefix. The operations of 1505 may be performed in accordance with examples as disclosed herein. In some examples, aspects of the operations of 1505 may be performed by a configuration manager 925 as described with reference to FIG. 9.

At 1510, the method may include receiving, according to the indication, the two or more time domain blocks via the SC waveform. The operations of 1510 may be performed in accordance with examples as disclosed herein. In some examples, aspects of the operations of 1510 may be performed by a time domain block manager 930 as described with reference to FIG. 9.

At 1515, the method may include decoding the control information from the two or more time domain blocks. The operations of 1515 may be performed in accordance with examples as disclosed herein. In some examples, aspects of the operations of 1515 may be performed by a decoder 935 as described with reference to FIG. 9.

Figure 16:
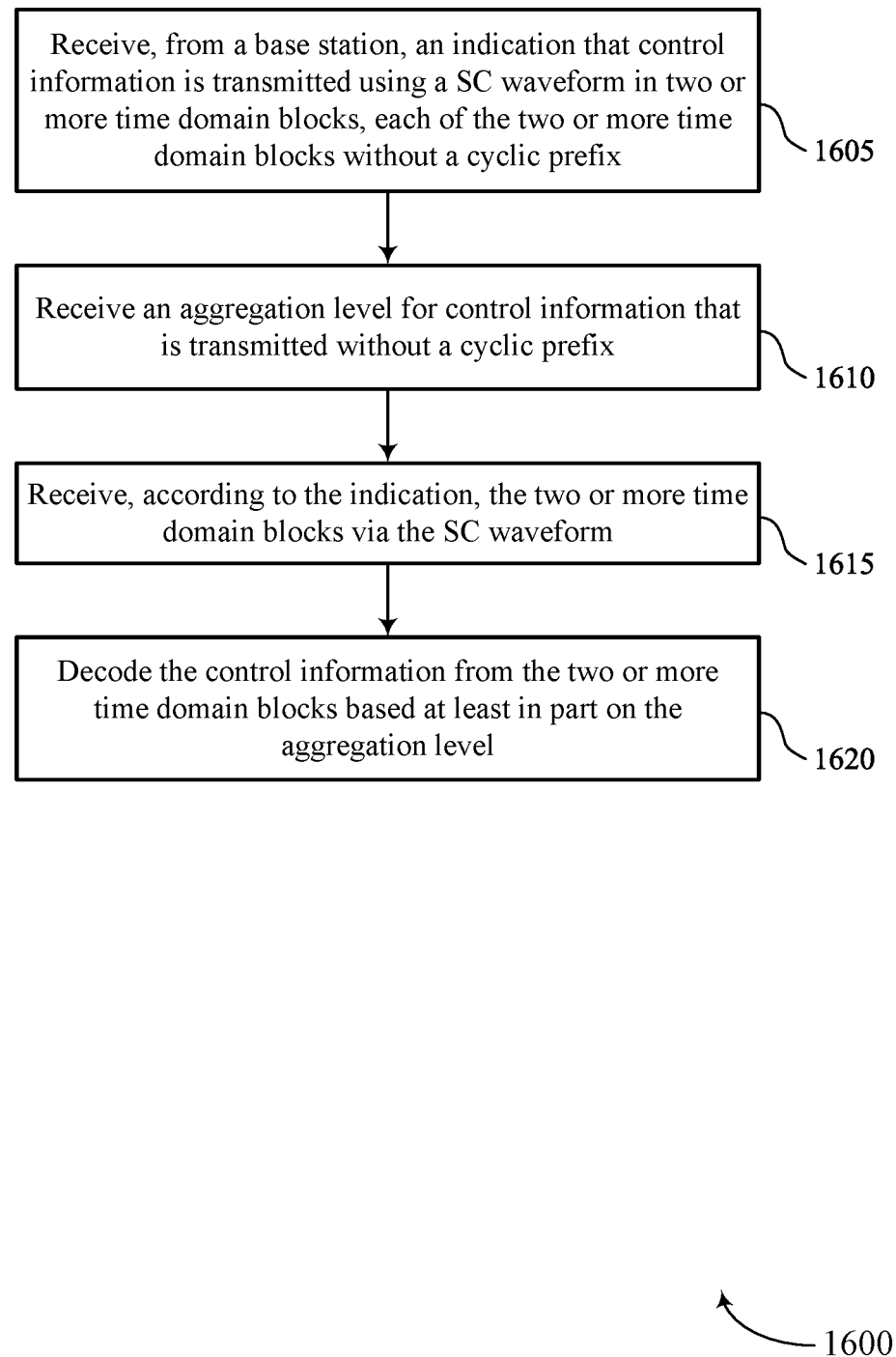

FIG. 16 shows a flowchart illustrating a method 1600 that supports time domain CORESET design for SC waveforms in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication that control information is transmitted using a SC waveform in two or more time domain blocks, each of the two or more time domain blocks without a cyclic prefix. The operations of 1605 may be performed in accordance with examples as disclosed herein. In some examples, aspects of the operations of 1605 may be performed by a configuration manager 925 as described with reference to FIG. 9.

At 1610, the method may include receiving an aggregation level for control information that is transmitted without a cyclic prefix. The operations of 1610 may be performed in accordance with examples as disclosed herein. In some examples, aspects of the operations of 1610 may be performed by an aggregation level manager 940 as described with reference to FIG. 9.

At 1615, the method may include receiving, according to the indication, the two or more time domain blocks via the SC waveform. The operations of 1615 may be performed in accordance with examples as disclosed herein. In some examples, aspects of the operations of 1615 may be performed by a time domain block manager 930 as described with reference to FIG. 9.

At 1620, the method may include decoding the control information from the two or more time domain blocks based at least in part on the aggregation level. The operations of 1620 may be performed in accordance with examples as disclosed herein. In some examples, aspects of the operations of 1620 may be performed by a decoder 935 as described with reference to FIG. 9. In some cases, the control information is being transmitted in two or more CCEs in the two or more time domain blocks.

Figure 17:
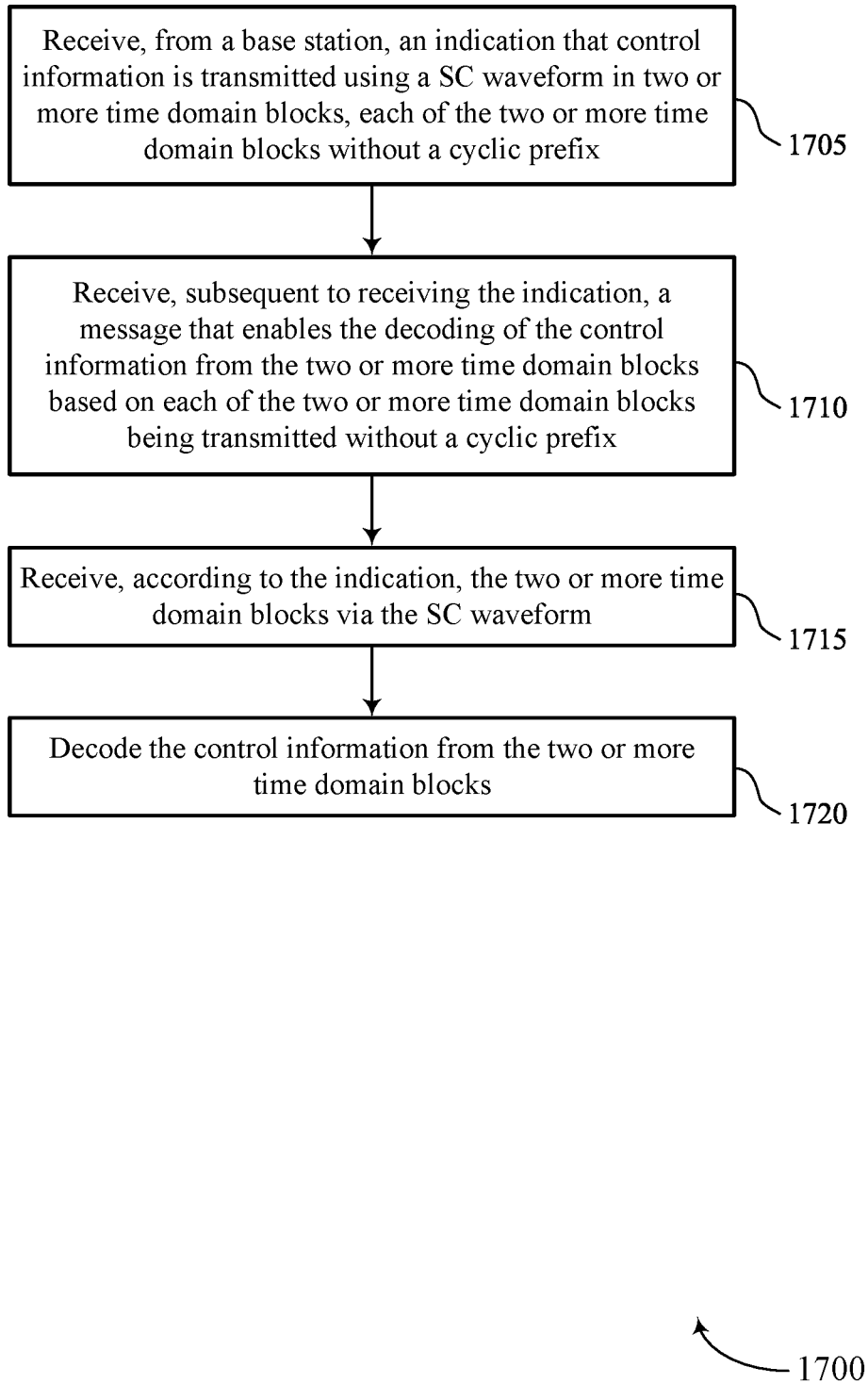

FIG. 17 shows a flowchart illustrating a method 1700 that supports time domain CORESET design for SC waveforms in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, an indication that control information is transmitted using a SC waveform in two or more time domain blocks, each of the two or more time domain blocks without a cyclic prefix. The operations of 1705 may be performed in accordance with examples as disclosed herein. In some examples, aspects of the operations of 1705 may be performed by a configuration manager 925 as described with reference to FIG. 9. In some cases, RRC signaling may be received that includes one or more parameters associated with control information transmissions, and SC waveform transmissions without a cyclic prefix is performed based on the one or more parameters.

At 1710, the method may include receiving, subsequent to receiving the indication, a message that enables the decoding of the control information from the two or more time domain blocks based on each of the two or more time domain blocks being transmitted without a cyclic prefix. The operations of 1710 may be performed in accordance with examples as disclosed herein. In some examples, aspects of the operations of 1710 may be performed by a time domain block manager 930 as described with reference to FIG. 9. In some cases, the message is received in one or more of a MAC-CE, a DCI transmission, RRC signaling, or any combinations thereof.

At 1715, the method may include receiving, according to the indication, the two or more time domain blocks via the SC waveform. The operations of 1715 may be performed in accordance with examples as disclosed herein. In some examples, aspects of the operations of 1715 may be performed by a time domain block manager 930 as described with reference to FIG. 9.

At 1720, the method may include decoding the control information from the two or more time domain blocks. The operations of 1720 may be performed in accordance with examples as disclosed herein. In some examples, aspects of the operations of 1720 may be performed by a decoder 935 as described with reference to FIG. 9.

Figure 18:
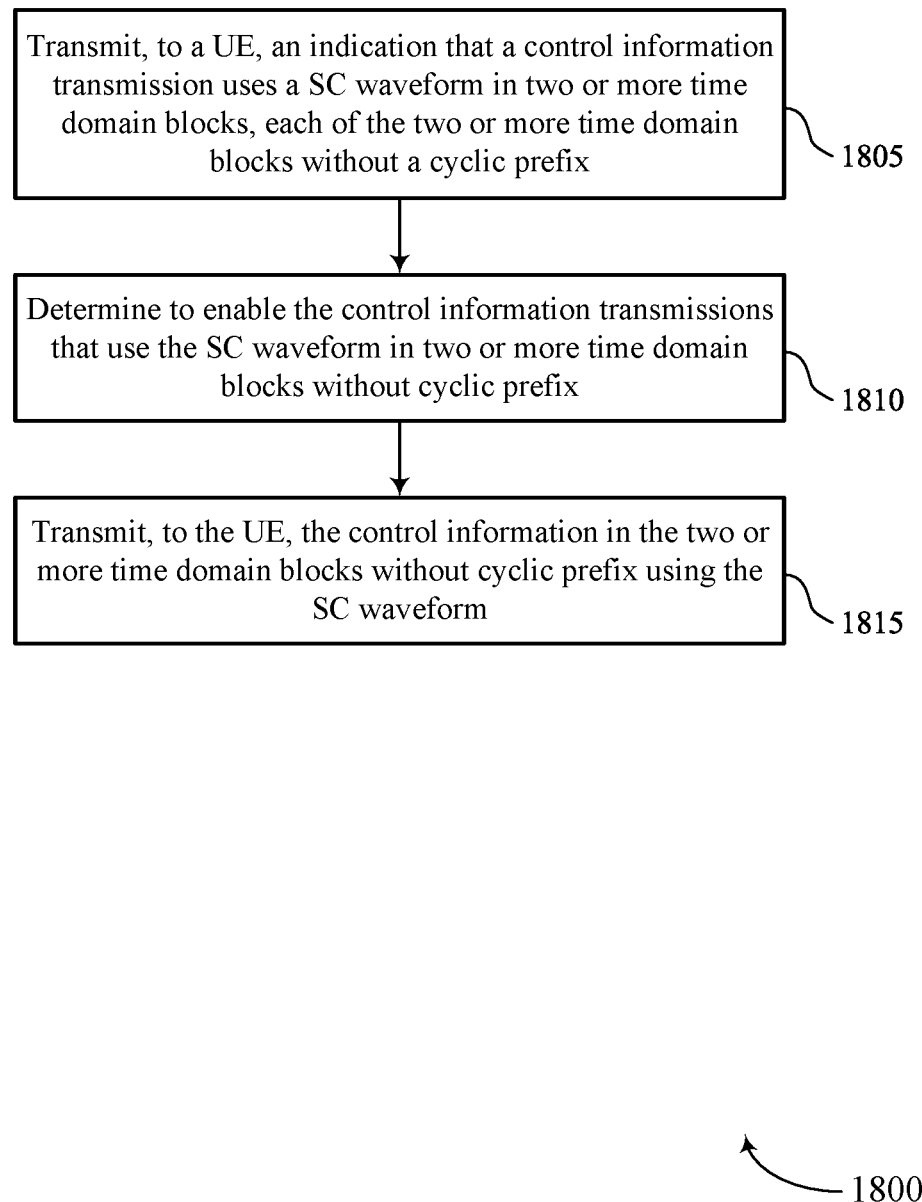

FIG. 18 shows a flowchart illustrating a method 1800 that supports time domain CORESET design for SC waveforms in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication that a control information transmission uses a SC waveform in two or more time domain blocks, each of the two or more time domain blocks without a cyclic prefix. The operations of 1805 may be performed in accordance with examples as disclosed herein. In some examples, aspects of the operations of 1805 may be performed by a configuration manager 1325 as described with reference to FIG. 13.

At 1810, the method may include determining to enable the control information transmissions that use the SC waveform in two or more time domain blocks without cyclic prefix. The operations of 1810 may be performed in accordance with examples as disclosed herein. In some examples, aspects of the operations of 1810 may be performed by a time domain block manager 1330 as described with reference to FIG. 13.

At 1815, the method may include transmitting, to the UE, the control information in the two or more time domain blocks without cyclic prefix using the SC waveform. The operations of 1815 may be performed in accordance with examples as disclosed herein. In some examples, aspects of the operations of 1815 may be performed by a control information manager 1335 as described with reference to FIG. 13.

Figure 19:
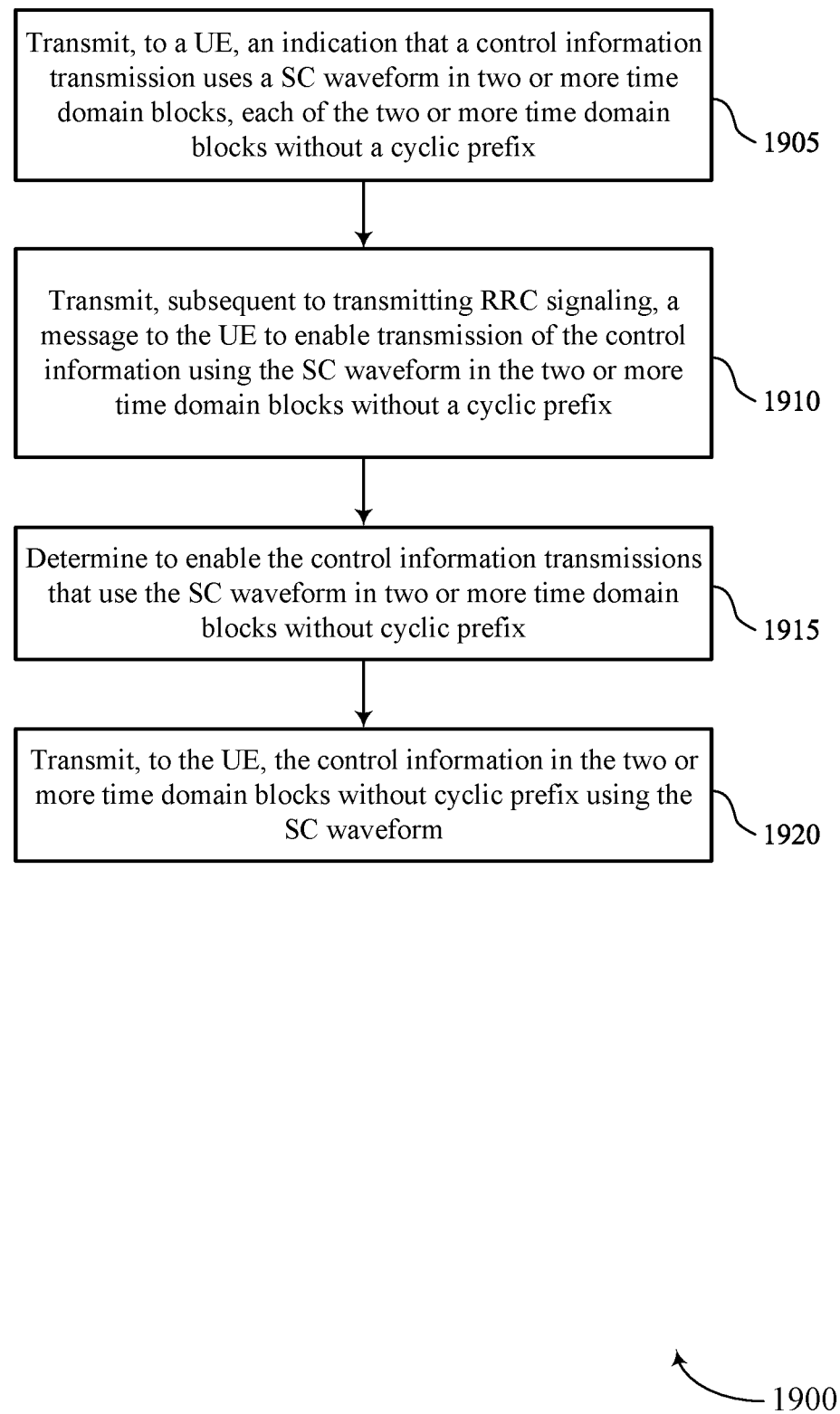

FIG. 19 shows a flowchart illustrating a method 1900 that supports time domain CORESET design for SC waveforms in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication that a control information transmission uses a SC waveform in two or more time domain blocks, each of the two or more time domain blocks without a cyclic prefix. The operations of 1905 may be performed in accordance with examples as disclosed herein. In some examples, aspects of the operations of 1905 may be performed by a configuration manager 1325 as described with reference to FIG. 13. In some cases, RRC signaling may be transmitted that includes one or more parameters associated with control information transmissions, and the SC waveform transmissions without cyclic prefix are based at least in part on the one or more parameters.

At 1910, the method may include transmitting, subsequent to transmitting the RRC signaling, a message to the UE to enable transmission of the control information using the SC waveform in the two or more time domain blocks without a cyclic prefix. The operations of 1910 may be performed in accordance with examples as disclosed herein. In some examples, aspects of the operations of 1910 may be performed by a time domain block manager 1330 as described with reference to FIG. 13. In some cases, the message may be transmitted in one or more of a MAC-CE, a DCI transmission, RRC signaling, or any combinations thereof.

At 1915, the method may include determining to enable the control information transmissions that use the SC waveform in two or more time domain blocks without cyclic prefix. The operations of 1915 may be performed in accordance with examples as disclosed herein. In some examples, aspects of the operations of 1915 may be performed by a time domain block manager 1330 as described with reference to FIG. 13.

At 1920, the method may include transmitting, to the UE, the control information in the two or more time domain blocks without cyclic prefix using the SC waveform. The operations of 1920 may be performed in accordance with examples as disclosed herein. In some examples, aspects of the operations of 1920 may be performed by a control information manager 1335 as described with reference to FIG. 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, an indication that control information is transmitted using a single carrier waveform in two or more time domain blocks, each of the two or more time domain blocks without a cyclic prefix; receiving, according to the indication, the two or more time domain blocks via the single carrier waveform; and decoding the control information from the two or more time domain blocks.

Aspect 2: The method of aspect 1, wherein the control information is transmitted in two or more control channel elements (CCEs) in the two or more time domain blocks.

Aspect 3: The method of aspect 2, further comprising: receiving an aggregation level for control information that is transmitted without a cyclic prefix, and wherein the decoding is further based at least in part on the aggregation level.

Aspect 4: The method of any of aspects 2 through 3, wherein the control information is non-uniformly segmented across the two or more CCEs in the two or more time domain blocks.

Aspect 5: The method of any of aspects 2 through 4, wherein each CCE has an associated DMRS that is transmitted in a corresponding time domain block.

Aspect 6: The method of aspect 5, wherein two or more DMRSs are non-uniform across the two or more time domain blocks.

Aspect 7: The method of any of aspects 5 through 6, wherein each CCE and associated DMRS are distributed in the two or more time domain blocks based on time domain parameters without any fast Fourier transform (FFT) size restrictions.

Aspect 8: The method of any of aspects 1 through 7, wherein the receiving the indication comprises: receiving RRC signaling that includes one or more parameters associated with control information transmissions.

Aspect 9: The method of aspect 8, further comprising: receiving, subsequent to receiving the indication, a message that enables the decoding of the control information from the two or more time domain blocks based on each of the two or more time domain blocks being transmitted without a cyclic prefix.

Aspect 10: The method of aspect 9, wherein the message is received in one or more of a medium access control (MAC) control element, a DCI transmission, RRC signaling, or any combinations thereof.

Aspect 11: A method for wireless communication at a base station, comprising: transmitting, to a UE, an indication that a control information transmission uses a single carrier waveform in two or more time domain blocks, each of the two or more time domain blocks without a cyclic prefix; determining to enable the control information transmissions that use the single carrier waveform in two or more time domain blocks without cyclic prefix; and transmitting, to the UE, the control information in the two or more time domain blocks without cyclic prefix using the single carrier waveform.

Aspect 12: The method of aspect 11, wherein the control information is transmitted in two or more control channel elements (CCEs) in the two or more time domain blocks.

Aspect 13: The method of aspect 12, wherein the indication further provides an aggregation level for control information that is transmitted without a cyclic prefix.

Aspect 14: The method of any of aspects 12 through 13, wherein the control information is non-uniformly segmented across the two or more CCEs.

Aspect 15: The method of any of aspects 12 through 14, wherein each CCE has an associated DMRS that is transmitted in a corresponding time domain block.

Aspect 16: The method of aspect 15, wherein two or more DMRSs are non-uniform across the two or more time domain blocks.

Aspect 17: The method of any of aspects 15 through 16, wherein each CCE and associated DMRS are distributed in the two or more time domain blocks based on time domain parameters without any fast Fourier transform (FFT) size restrictions.

Aspect 18: The method of any of aspects 11 through 17, wherein the transmitting the indication comprises: transmitting RRC signaling that includes one or more parameters associated with control information transmissions.

Aspect 19: The method of aspect 18, further comprising: transmitting, subsequent to transmitting the RRC signaling, a message to the UE to enable transmission of the control information using the single carrier waveform in the two or more time domain blocks without a cyclic prefix.

Aspect 20: The method of aspect 19, wherein the message is transmitted in one or more of a medium access control (MAC) control element, a DCI transmission, RRC signaling, or any combinations thereof.

Aspect 21: An apparatus for wireless communication at a UE, comprising a processor; memory coupled with the processor; and instructions stored in the memory and executable by the processor to cause the apparatus to perform a method of any of aspects 1 through 10.

Aspect 22: An apparatus for wireless communication at a UE, comprising at least one means for performing a method of any of aspects 1 through 10.

Aspect 23: A non-transitory computer-readable medium storing code for wireless communication at a UE, the code comprising instructions executable by a processor to perform a method of any of aspects 1 through 10.

Aspect 24: An apparatus for wireless communication at a base station, comprising a processor; memory coupled with the processor; and instructions stored in the memory and executable by the processor to cause the apparatus to perform a method of any of aspects 11 through 20.

Aspect 25: An apparatus for wireless communication at a base station, comprising at least one means for performing a method of any of aspects 11 through 20.

Aspect 26: A non-transitory computer-readable medium storing code for wireless communication at a base station, the code comprising instructions executable by a processor to perform a method of any of aspects 11 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, an indication that control information is transmitted using a single carrier waveform in two or more time domain blocks, each of the two or more time domain blocks without a cyclic prefix;
   receiving, according to the indication, the two or more time domain blocks via the single carrier waveform; and
   decoding the control information from the two or more time domain blocks.

2. The method of claim 1, wherein the control information is transmitted in two or more control channel elements (CCEs) in the two or more time domain blocks.

3. The method of claim 2, further comprising:
receiving an aggregation level for control information that is transmitted without a cyclic prefix, and wherein the decoding is further based at least in part on the aggregation level.

4. The method of claim 2, wherein the control information is non-uniformly segmented across the two or more CCEs in the two or more time domain blocks.

5. The method of claim 2, wherein each CCE has an associated demodulation reference signal (DMRS) that is transmitted in a corresponding time domain block.

6. The method of claim 5, wherein two or more DMRSs are non-uniform across the two or more time domain blocks.

7. The method of claim 5, wherein each CCE and associated DMRS are distributed in the two or more time domain blocks based on time domain parameters without any fast Fourier transform (FFT) size restrictions.

8. The method of claim 1, wherein the receiving the indication comprises:
receiving radio resource control (RRC) signaling that includes one or more parameters associated with control information transmissions.

9. The method of claim 8, further comprising:
receiving, subsequent to receiving the indication, a message that enables the decoding of the control information from the two or more time domain blocks based on each of the two or more time domain blocks being transmitted without a cyclic prefix.

10. The method of claim 9, wherein the message is received in one or more of a medium access control (MAC) control element, a downlink control information (DCI) transmission, RRC signaling, or any combinations thereof.

11. A method for wireless communication at a base station, comprising:
transmitting, to a user equipment (UE), an indication that a control information transmission uses a single carrier waveform in two or more time domain blocks, each of the two or more time domain blocks without a cyclic prefix;
determining to enable the control information transmissions that use the single carrier waveform in two or more time domain blocks without cyclic prefix; and
transmitting, to the UE, the control information in the two or more time domain blocks without cyclic prefix using the single carrier waveform.

12. The method of claim 11, wherein the control information is transmitted in two or more control channel elements (CCEs) in the two or more time domain blocks.

13. The method of claim 12, wherein the indication further provides an aggregation level for control information that is transmitted without a cyclic prefix.

14. The method of claim 12, wherein the control information is non-uniformly segmented across the two or more CCEs.

15. The method of claim 12, wherein each CCE has an associated demodulation reference signal (DMRS) that is transmitted in a corresponding time domain block.

16. The method of claim 15, wherein two or more DMRSs are non-uniform across the two or more time domain blocks.

17. The method of claim 15, wherein each CCE and associated DMRS are distributed in the two or more time domain blocks based on time domain parameters without any fast Fourier transform (FFT) size restrictions.

18. The method of claim 11, wherein the transmitting the indication comprises:
transmitting radio resource control (RRC) signaling that includes one or more parameters associated with control information transmissions.

19. The method of claim 18, further comprising:
transmitting, subsequent to transmitting the RRC signaling, a message to the UE to enable transmission of the control information using the single carrier waveform in the two or more time domain blocks without a cyclic prefix.

20. The method of claim 19, wherein the message is transmitted in one or more of a medium access control (MAC) control element, a downlink control information (DCI) transmission, RRC signaling, or any combinations thereof.

21. An apparatus for wireless communication at a user equipment (UE), comprising:
a processor;
memory coupled with the processor; and
instructions stored in the memory and executable by the processor to cause the apparatus to:
receive, from a base station, an indication that control information is transmitted using a single carrier waveform in two or more time domain blocks, each of the two or more time domain blocks without a cyclic prefix;
receive, according to the indication, the two or more time domain blocks via the single carrier waveform; and
decode the control information from the two or more time domain blocks.

22. The apparatus of claim 21, wherein the control information is transmitted in two or more control channel elements (CCEs) in the two or more time domain blocks.

23. The apparatus of claim 22, wherein the control information is non-uniformly segmented across the two or more CCEs in the two or more time domain blocks, and wherein each CCE has an associated demodulation reference signal (DMRS) that is transmitted in a corresponding time domain block.

24. The apparatus of claim 21, wherein the instructions to receive the indication are executable by the processor to cause the apparatus to:
receive radio resource control (RRC) signaling that includes one or more parameters associated with control information transmissions, and
receive, subsequent to receiving the indication, a message that enables the decoding of the control information from the two or more time domain blocks based on each of the two or more time domain blocks being transmitted without a cyclic prefix.

25. The apparatus of claim 24, wherein the message is received in one or more of a medium access control (MAC) control element, a downlink control information (DCI) transmission, RRC signaling, or any combinations thereof.

26. An apparatus for wireless communication at a base station, comprising:
a processor;
memory coupled with the processor; and
instructions stored in the memory and executable by the processor to cause the apparatus to:
transmit, to a user equipment (UE), an indication that a control information transmission uses a single carrier waveform in two or more time domain blocks, each of the two or more time domain blocks without a cyclic prefix;

determine to enable the control information transmissions that use the single carrier waveform in two or more time domain blocks without cyclic prefix; and transmit, to the UE, the control information in the two or more time domain blocks without cyclic prefix using the single carrier waveform.

27. The apparatus of claim 26, wherein the control information is transmitted in two or more control channel elements (CCEs) in the two or more time domain blocks.

28. The apparatus of claim 27, wherein the control information is non-uniformly segmented across the two or more CCEs, and each CCE has an associated demodulation reference signal (DMRS) that is transmitted in a corresponding time domain block.

29. The apparatus of claim 26, wherein the instructions to transmit the indication are executable by the processor to cause the apparatus to:

transmit radio resource control (RRC) signaling that includes one or more parameters associated with control information transmissions, and transmit, subsequent to transmitting the RRC signaling, a message to the UE to enable transmission of the control information using the single carrier waveform in the two or more time domain blocks without a cyclic prefix.

30. The apparatus of claim 29, wherein the message is transmitted in one or more of a medium access control (MAC) control element, a downlink control information (DCI) transmission, RRC signaling, or any combinations thereof.

* * * * *